(12) United States Patent
Faiczak

(10) Patent No.: US 11,441,699 B2
(45) Date of Patent: Sep. 13, 2022

(54) DIFFERENTIAL PRESSURE LOSS VALVE

(71) Applicant: John Faiczak, Toronto (CA)

(72) Inventor: John Faiczak, Toronto (CA)

(*) Notice: Subject to any disclaimer, the term of this patent is extended or adjusted under 35 U.S.C. 154(b) by 0 days.

(21) Appl. No.: 16/196,693

(22) Filed: Nov. 20, 2018

(65) Prior Publication Data

US 2020/0158260 A1     May 21, 2020

(51) Int. Cl.
*F16K 37/00*     (2006.01)
*F16K 47/12*     (2006.01)

(52) U.S. Cl.
CPC .......... *F16K 47/12* (2013.01); *F16K 37/0083* (2013.01); *F16K 37/0091* (2013.01)

(58) Field of Classification Search
CPC ................................. F16K 47/06; F16K 47/12
See application file for complete search history.

(56) References Cited

U.S. PATENT DOCUMENTS

| | | | | |
|---|---|---|---|---|
| 2,323,115 A * | 6/1943 | Bryant | .................. | G05D 13/00 138/43 |
| 3,841,354 A * | 10/1974 | McDonnell | ....... | A61M 5/16881 138/43 |
| 4,589,872 A * | 5/1986 | Bellin | ............... | A61M 5/16881 138/43 |
| 4,632,359 A * | 12/1986 | Tooth | ...................... | F16K 47/02 251/126 |
| 4,653,695 A * | 3/1987 | Eckstein | .............. | A01G 25/023 239/542 |
| 6,644,620 B2 * | 11/2003 | Johnson | .................... | F16K 1/42 251/126 |
| 10,464,081 B2 * | 11/2019 | Wang | .................... | A01G 25/023 |
| 2005/0224737 A1 * | 10/2005 | Mihaylov | ............... | F16K 47/12 251/126 |

* cited by examiner

*Primary Examiner* — Reinaldo Sanchez-Medina

(74) *Attorney, Agent, or Firm* — Benesch, Friedlander, Coplan & Aronoff LLP

(57) ABSTRACT

The present invention is a differential pressure loss valve comprising a valve housing that incorporates: a sleeve that incorporates a continuous cylindrical helical thread formed in the inner surface thereof; and a cylindrical channel carrier incorporating a cylindrical helical thread formed in the outer surface thereof. When the channel carrier is positioned within the sleeve a portion of the sleeve cylindrical helical thread integrates with the channel carrier cylindrical helical thread, and a composite channel is formed there-between. The geometric configuration of the composite channel is consistent throughout such composite channel, although the geometric configuration may differ in individual embodiments of the present invention. Fluid can flow within the valve between an inlet port incorporated in the sleeve and an outlet port incorporated in the valve housing and through the composite channel, or any portion thereof between the inlet port and outlet port, if any.

19 Claims, 13 Drawing Sheets

DIFFERENTIAL PRESSURE LOSS VALVE

FIELD OF INVENTION

This invention relates in general to the field of valves and more particularly to differential pressure loss valves.

BACKGROUND OF THE INVENTION

A variety of types of valves have been previously developed that incorporate channels formed therein. The prior art valves also include valves that are operable to permit the flow of fluid within the valve. The function of such prior art valves is to conduct fluid through an internal channel. Such valves will generate a differential pressure loss between the input port of the channel whereby the fluid enters the valve, and the output port of the channel whereby fluid exits the valve.

In such prior art valves, if the channel incorporates a significant curvature, such as, for example, a channel that incorporates a 90 degree curvature, the differential pressure loss across the curved section will be 3 to 7 times greater than that occurring across an equal length of channel that is straight and is formed of the same material as the curved section.

The function of prior art valves has shown that the cross-sectional area of a channel within a valve, through which fluid is flowing, can significantly influence the magnitude of the differential pressure measured between the input port and the output port of the channel. With the same flow rate and channel length, the channel with the smaller cross-sectional area may generate a greater differential pressure loss than that generated by either a straight channel or a channel having a larger cross-sectional area. With the same flow rate and channel length, the channel that has a smaller cross-sectional area and a curved section within the length will generate significantly greater differential pressure loss than that generated by a straight channel and one with a larger cross-sectional area. The combined effect can generate differential pressure loss amplification in the order of 20 to 1, (20:1).

Common prior art valve body types have either a 0 to 90 degree rotational travel, or less than 5 multi-turn rotational travel. Such rotational travel limitations in prior art valves are formed by the geometry of the channel cross-section and to effect possible simultaneous changes of channel length. The design of recently created prior art valves is generally based on the adjustment of the channel geometry by some degree of valve stem rotation.

The change in differential pressure drop of a prior art valve is generated between the inlet port (whereby fluid enters the valve) and the outlet port (whereby fluid exits the valve) as a function of change in geometry of the channel cross-section, and possibly further by simultaneous changes of channel length.

The relationship between pressure drop and rotational position of the valve stem in prior art valves, known as the gain or transfer function of the device, is non-linear. This non-linear characteristic of prior art valves can be troublesome for achieving stability in robotically controlled industrial uses (e.g., HVAC systems, machines, etc.), due to: (i) low gain (line loss pressure change per degree of valve rotation) at positions when the valve is either open or nearly fully open, being the positions wherein the orifice achieves the largest circumference possible for the valve to achieve; and (ii) high gain at positions when the valve is either closed or nearly closed, being the positions wherein the orifice achieves the smallest circumference possible for the valve to achieve.

This non-linearity of prior art valves is often compensated for (e.g., made approximately linear), by the combination of the valve with an electric actuator that incorporates an electronic converter. Such a configuration requires the expenditure of a significant cost to create approximate linearity through use of a non-linear valve. Without such an electronic convertor being so connected to the valve, instability issues occur more frequently, with the results of: (i) unacceptable cycling of the controlled variable (that may be one of the following that is directly or indirectly effected by the differential pressure loss created within a valve: air temperature, water temperature, relative humidity, and fluid flow); and (ii) actuator wear and tear that may lead to fluid leaks occurring at the valve packing around the valve stem.

The design of some prior art valves incorporates metering ports positioned between the inlet and outlet ports and across the valve orifice section. Such metering ports are provided as a means to measure the differential pressure loss across the orifice generated by the flow rate of the fluid passing through the valve orifice. A chart, designed by the valve manufacturer, may be used by an operator of the valve to determine the actual flow rate of the fluid through the valve. The operator will require the measured differential pressure loss, and the indicator of the rotational position of the valve that can be gleaned from the chart, to achieve such a determination of the actual flow rate of the fluid through the valve. Repeated manual readjustment, measurement of the valve position, and use of the manufacturer's look-up chart to verify the approximate (actual) flow of the fluid, can improve the possibility of achieving the desired flow rate of fluid through the valve. However, when any other similar manual or robotic adjustment of a prior art valve within a fluid distribution system changes such valve's differential pressure loss, the achieved desired fluid flow will be altered.

Some hand operated prior art valves incorporate a varying orifice along a conical spiral length. The conical spiral length contains a channel formed in the interior of the spiral, and the geometry of such channel changes along the channel length. Such prior art valves are uniquely designed and manufactured to provide a calibrated relationship between rotational position (as a measured index value of the valve stem and the dispensed flow though the valve), and a specific applied pressure between the inlet and outlet ports of the valve. A related chart, designed by the valve manufacturer, may then be used by the valve operator, to determine the actual flow of fluid being dispensed through the valve. The operator may utilize the known applied pressure and the index value on the chart, to achieve the determination of the actual flow of the fluid being dispensed through the valve.

If this type of prior art valve is designed to operate with a known fixed applied pressure, the actual flow may be indicated on a rotary manual dial incorporated in the valve. Such a prior art valve will not require the operator to utilize the chart or the index value. The non-linear relationship between the flow rate of the fluid and the rotational position of the valve dial will be accommodated in the custom design of the rotary manual dial of the valve.

Where a specific flow of fluid is required to occur within such a prior art valve, and the flow of fluid must remain within a narrow range of variation, and the available applied pressure of the fluid distribution system (FDS) is known and stable within the same permissible range of variation, a suitable channel (that may be formed of various cross-sectional geometry and channel length) may be designed to produce the desired flow. The foregoing is applicable in particular to high volume production of specialized fixed prior art valve devices.

Examples of some prior art valves are provided in patent documents, such as are set out below.

U.S. Pat. No. 4,506,423 granted on Mar. 26, 1985 to Hitachi, Ltd., discloses a fluid pressure reducing device, having a core provided with a peripheral spiral groove and a pipe receiving the core. The portion of the pipe receiving the core is radially contracted so that the ridges of the spiral groove of the core intrude into the inner peripheral surface of the pipe, and thereby form a spiral passage between the pipe and the core. The pressure of a fluid is reduced as the fluid flows through the spiral passage. The fluid enters the passage from a port positioned above the core. The length of the passage is a fixed length and is not adjustable, such that the fluid must always flow through the whole of the length of the passage in all uses of the fluid pressure reducing device.

U.S. Pat. No. 6,644,620 granted on Nov. 11, 2003 to IMI Cornelius Inc., discloses a dispensing valve that controls the flow of a fluid. The valve has a housing containing a cylindrical/tubular passageway between an inlet and outlet of the valve. A rod like closure member is operable to move through the passageway from a fully closed position and to a fully open position. The passageway is sealed. There is no port formed in the housing wherein the valve may be positioned. The housing wherein the valve may be positioned is not of a greater height than the valve. The valve is always positioned within the housing such that fluid immediately enters a passageway, and there is no flow of fluid within the housing prior to the fluid reaching a passageway.

U.S. Pat. No. 6,981,689 granted on Jan. 3, 2006 to Gueorgui Milev Mihaylov and Evdokia Kirilova Mihaylov, discloses a flow metering valve that comprises a tubular body and moving stem within said body. At least one of the inner surface of the tubular body or the outer surface of the stem is threaded, and the threads are truncated by tapering truncation from the crest to the root. The truncating thread forms a channel having a cross-section that tapers from one port to another. The positions that the stem can be placed in within the body changes the cross-section of the channel that provides variable flow communication between the ports. The tapered shape of the stem causes an inconsistent relationship for the pressure drop created by the valve when the position of the stem within the body is altered.

U.S. Pat. No. 7,174,717 granted on Feb. 13, 2007 to Pratt & Whitney Canada Corp., discloses a fuel distributor for a fuel nozzle in a gas turbine engine that incorporates at least two helical channels. The channels are formed in at least one of an outer surface of an inner tubular body, and an inner surface of an outer tubular body. The inner tubular body fits within the outer body. A sealing contact is formed between the inner tubular body and the inner surface of the outer tubular body. Each channel incorporates an exit port whereby fluid flowing through the channels exits the channels. The inner tubular body and the outer tubular body are of the same height. The inner tubular body may only be positioned in a single position when inserted within the outer tubular body, and the length of the channels is a fixed length and is not adjustable, such that the fluid must flow through the whole of the length of the channels in all uses of the fuel distributor.

None of the prior art valves are operable to provide a consistent, and accurate, linear relationship between differential pressure loss and active channel length within the valve, at an industrial use (e.g., HVAC, machine, etc.) specific flow (the "gain"). What is needed is a valve that achieves constant gain and that permits more precision in setting a differential pressure loss, and further achieves sustainable stability and lower set-up and maintenance labour costs.

SUMMARY OF THE INVENTION

In one aspect, the present disclosure relates to a differential pressure loss valve comprising: a sleeve incorporating a cylindrical hollow section having a continuous cylindrical helical thread formed in said cylindrical hollow section; a channel carrier incorporating a continuous cylindrical helical thread formed in its outer wall, and said channel carrier being configured to fit within the cylindrical hollow section of the sleeve such that at least a portion of the cylindrical helical thread of the sleeve overlaps with at least a portion of the cylindrical helical thread of the channel carrier, and the space between the cylindrical helical thread of a portion of the channel carrier being positioned within the sleeve and the cylindrical helical thread of the sleeve facing the portion of the channel carrier positioned within the sleeve form a composite channel, said composite channel having a constant cross-section; a housing configured such that the sleeve and channel carrier are within the housing; an inlet port configured to receive fluid into the housing; and an outlet port configured to allow fluid having entered the housing via the inlet port to exit the housing after flowing through the portion of the sleeve positioned downstream from the inlet port; wherein fluid flows through the valve housing and the differential pressure loss of the valve is controllable by positioning the channel carrier within the sleeve.

In another aspect the present disclosure relates to the differential pressure loss valve wherein the channel carrier is moveable to varying positions within the sleeve.

In another aspect the present disclosure relates to the differential pressure loss valve wherein the channel carrier is moved within the sleeve between positions that achieve a fully opened valve and a fully closed valve.

In another aspect the present disclosure relates to the differential pressure loss valve wherein the composite channel is operable for fluid to flow therein, and said portion of the composite channel that is downstream of the inlet port wherein fluid flows being an active channel length.

In another aspect the present disclosure relates to the differential pressure loss valve wherein the fluid flowing through the inlet port flows through one or more of the following within the valve before reaching the outlet port: the active channel length; a space between the inlet port and the active channel length; a space between the active channel length and the outlet port; and a space between the inlet port and the outlet port wherein there is no active channel length positioned.

In another aspect the present disclosure relates to the differential pressure loss valve wherein the composite channel is configured at a constant cross-section throughout and the composite channel is formed of one or more rounds, each round and all rounds having a constant diameter, the fluid flow within said composite channel thereby achieving consistent incremental differential pressure loss.

In another aspect the present disclosure relates to the differential pressure loss valve wherein the valve is configured for use in a range of flow and differential pressure loss applications as relate to various industrial uses.

In another aspect the present disclosure relates to the differential pressure loss valve wherein the valve is connected to an assembly.

In another aspect the present disclosure relates to the differential pressure loss valve wherein the assembly is operable to move the channel carrier to various positions within the sleeve by any of the following: manual operation; or robotic operation.

In another aspect the present disclosure relates to the differential pressure loss valve wherein the channel carrier is movable within the sleeve by rotation of the channel carrier and the overlap of the cylindrical helical thread of the sleeve and the cylindrical helical thread of the channel carrier causes and maintains alignment between the sleeve and the channel carrier therein.

In another aspect the present disclosure relates to the differential pressure loss valve wherein there is no seal formed between the cylindrical helical thread of the channel carrier and the cylindrical helical thread of the sleeve, and gaps exist in the composite channel between the overlap of the cylindrical helical thread of the channel carrier and the cylindrical helical thread of the sleeve.

In another aspect the present disclosure relates to the differential pressure loss valve wherein fluid may flow between the gaps, and such fluid is operable to lubricate the cylindrical helical thread of the channel carrier and the cylindrical helical thread of the sleeve to assist in the ease of movement of the channel carrier within the sleeve.

In another aspect the present disclosure relates to the differential pressure loss valve wherein the valve is configured to achieve constant gain and to function to achieve linearity.

In another aspect the present disclosure relates to the differential pressure loss valve wherein the cross-section of the composite channel is one of the following: a greater portion of the composite channel is formed between walls formed by the cylindrical helical thread of the sleeve; a greater portion of the composite channel is formed between walls formed by the cylindrical helical thread of the channel carrier; and the composite channel is formed within equal portions between the walls formed by the cylindrical helical thread of the sleeve and the walls formed by the cylindrical helical thread of the channel carrier.

In another aspect the present disclosure relates to the differential pressure loss valve wherein a composite channel section is positioned to connect the inlet port and a pressure relief port in the housing, whereby fluid can flow from the pressure relief port to the inlet port, and fluid can flow into the pressure relief port.

In another aspect the present disclosure relates to the differential pressure loss valve wherein the composite channel section incorporates a debris trap operable to capture debris in the fluid and to prevent such debris from flowing to the inlet port.

In yet another aspect the present disclosure relates to a linear differential pressure loss valve comprising: a sleeve configured to incorporate a cylindrical hollow section therein having a continuous cylindrical helical thread formed therein; a channel carrier incorporating a continuous cylindrical helical thread formed in its outer wall, and said channel carrier being configured to fit within the cylindrical hollow section of the sleeve such that at least a portion of the cylindrical helical thread of the sleeve overlaps with at least a portion of the cylindrical helical thread of the channel carrier, and space existing between the portion of the cylindrical helical thread of the channel carrier positioned within the sleeve and the portion of the cylindrical helical thread of the sleeve facing the portion of the cylindrical helical thread of the channel carrier positioned within the sleeve forms a composite channel; a housing configured to fit the sleeve and channel carrier within the housing; an inlet port configured to receive fluid into the housing, such fluid thereby flowing through the sleeve; and an outlet port configured to allow fluid having entered the housing via the inlet port to exit the housing; wherein constant gain is achieved by a positioning of the channel carrier within the sleeve in accordance with the linear relationship between pressure loss and length of the composite channel.

In another aspect the present disclosure relates to the linear differential pressure loss valve wherein the valve is operable to produce a variable differential pressure loss that is linearly proportional to a portion of the composite channel that is positioned downstream of the inlet port, being the active channel length.

In another aspect the present disclosure relates to the linear differential pressure loss valve wherein differential pressure loss is linearly proportional to the active channel length such that gain is a function of one or more of the following: all material that the linear differential pressure loss valve is formed of; composite channel cross-sectional geometry (orifice) and dimension; maximum design flow that is specific to an industrial use the linear differential pressure loss valve is configured to be utilized with; diameter of the channels between walls formed by each of the cylindrical helical thread of the channel carrier and the cylindrical helical thread of the sleeve; and characteristics of the fluid that flows through the linear differential pressure loss valve.

In yet another aspect the present disclosure relates to a method of use of a linear differential pressure loss valve assembly, comprising the steps of: a motor attached to the valve rotating a channel carrier of a linear differential pressure loss valve to a position within a sleeve of the differential pressure loss valve, said differential pressure loss valve incorporating a housing having an inlet port and outlet port and having therein the channel carrier positioned within the sleeve such that at least a portion of a cylindrical helical thread formed in an interior wall of the sleeve overlaps with at least a portion of a cylindrical helical thread formed in an exterior surface of the channel carrier, and space existing between said cylindrical helical thread of the sleeve and the cylindrical helical thread of the channel carrier that it faces forming a composite channel that has a constant cross-section; moving the channel carrier by rotation into a position in relation to the inlet port and thereby varying any length of the composite channel positioned downstream of the inlet port, being the active channel length; and fluid flowing into the linear differential pressure loss valve via the inlet port and flowing through the portion of the sleeve downstream from the inlet port to the outlet port, including any active channel length; wherein the position of the channel carrier within the sleeve achieves linearity of the function of the linear differential pressure loss valve.

In another aspect the present disclosure relates to the method of use of the linear differential pressure loss valve assembly further comprising the steps of: one or more sensors detecting flow within the valve; one or more sensors detecting the position of the channel carrier within the sleeve; determining a position of the channel carrier within the sleeve to achieve linear function based on the sensor detection; and operating the motor to rotate the channel carrier from its position to the determined position.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

BRIEF DESCRIPTION OF THE DRAWINGS

The invention will be better understood and objects of the invention will become apparent when consideration is given to the following detailed description thereof. Such description makes reference to the annexed drawings wherein.

Figure 1:
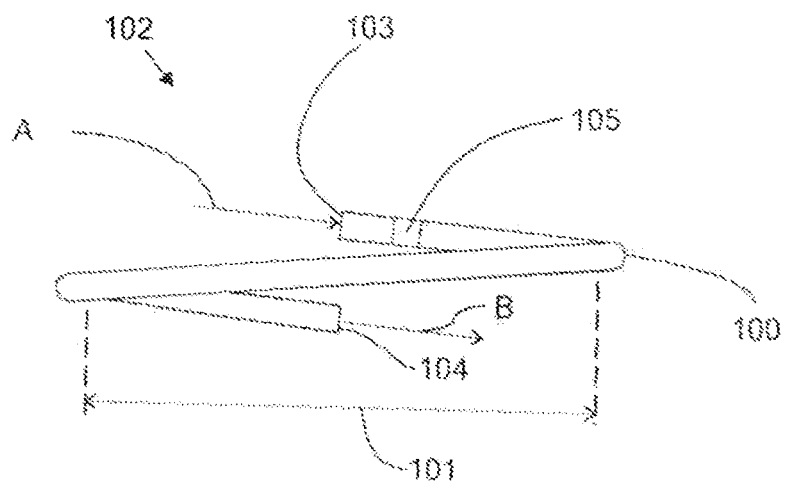
FIG. 1 is a representational view of a portion of the composite channel comprising an internal helical channel, showing a single helical rotation of such a composite channel of a valve of an embodiment of the present invention.

In the drawings, embodiments of the invention are illustrated by way of example. It is to be expressly understood that the description and drawings are only for the purpose of illustration and as an aid to understanding, and are not intended as a definition of the limits of the invention.

DETAILED DESCRIPTION OF THE PREFERRED EMBODIMENT

The present invention is a differential pressure loss valve comprising a valve housing that incorporates: a sleeve that incorporates a continuous cylindrical helical thread formed in the inner surface thereof; and a cylindrical channel carrier incorporating a cylindrical helical thread formed in the outer surface thereof. When the channel carrier is positioned within the sleeve a portion of the sleeve cylindrical helical thread integrates with the channel carrier cylindrical helical thread, and a composite channel is formed there-between. The geometric configuration of the composite channel is consistent throughout such composite channel, although the geometric configuration may differ in individual embodiments of the present invention. Fluid can flow within the valve between an inlet port incorporated in the sleeve and an outlet port incorporated in the valve housing and through the composite channel, or any portion thereof between the inlet port and outlet port, if any.

The composite channel is formed of a combination of: the walls formed by the cylindrical helical thread of the sleeve and the grooves between such walls; and the walls formed by the cylindrical helical thread of the sleeve and the grooves between such walls. The composite channel is positioned between the outer surface of the channel carrier and the inner surface of the sleeve that faces the outer surface of the channel carrier. The position of the composite channel is adjustable within the sleeve in relation to the inlet port and the length of the composite channel positioned downstream of the inlet port alters in accordance with various positions of the composite channel.

The sleeve is formed to have a cylindrical hollow section therein. The sleeve is thereby formed to incorporate a hollow. The sleeve may also be tubular in shape. The continuous cylindrical helical thread is formed in the surface of said cylindrical hollow section, being the interior wall of the sleeve. The cylindrical hollow section is configured to fit the channel carrier therein, such that at least a portion of the cylindrical helical thread of the sleeve will overlap with at least a portion of the cylindrical helical thread of the channel carrier when the channel carrier is fit within the sleeve. The circumference of the inner surface of the sleeve and the outer surface of the channel carrier are constant.

The sleeve, with a channel carrier positioned therein, can be positioned with a valve housing. The composite channel length through which fluid flows within the housing is variable, as described herein.

Embodiments of the present invention may be linear differential pressure loss valves. In such embodiments of the present invention, the flow rate of the fluid within the valve determines the differential pressure loss occurring between the inlet port and outlet port. Such a differential pressure loss valve provides a consistent, and accurate, linear relationship between differential pressure loss and active channel length within the valve, at a specific flow rate of the fluid within said valve.

All references to "active channel length" herein refer to the portion of the composite channel wherein fluid flows within the valve. The portion of the composite channel that will be "active", and will form the active channel length, will vary based upon the position of the channel carrier in relation to the inlet port within the sleeve, as discussed herein. The portion of the composite channel that is downstream of such inlet port, if any, forms the active channel length.

The relationship between the active channel length and the differential pressure loss within the valve is referenced as "gain" herein. Gain relates to the transfer function of the differential pressure loss valve of the present invention.

In differential pressure loss valve embodiments of the present invention, the constant gain of the valve is a linearity feature. For example, such an embodiment of the present invention may be operable within a robotically adjustable valve, wherein the linearity feature is essential to robotic operations of the valve. Linearity permits more precision, sustainable stability, and lower set-up and maintenance labour costs for the valve, in a variety of industrial uses incorporating the valve that involve either robotic manipulation or manual manipulation of differential pressure loss.

Embodiments of the present invention can be designed and configured for use with a variety of industrial uses. Many industrial uses of embodiments of the valve of the present invention are possible, including machine uses, robotic system uses, fluid distribution system uses, HVAC uses, etc. As an example, an embodiment of the differential pressure loss valve of the present invention can be incorporated within a fluid distribution system, such as an HVAC system or other fluid distribution system. Such an embodiment of the valve of the present invention may be operable to conduct fluid within a fluid distribution system.

The valve of the present invention may be attached to an actuator assembly that is operable to robotically adjust and readjust the valve to generate a specific differential pressure drop and to perform as a flow control device with a fluid distribution system. Such valves that are incorporated in such industrial uses may be operable to achieve a range of applications (e.g., a range of flow (gpm) and a range of differential pressure loss).

Embodiments of the valve of the present invention may further be valves that are manipulated robotically, or manipulated manually, to generate the required range of pressure loss related to fluid flow within a fluid distribution system. Such valves may be configured for operability with one or more specific types of fluid distribution systems.

The valve of the present invention is configured to comprise: a channel carrier formed as a circular shaft having a cylindrical helical thread formed therein, having grooves formed between the walls of the cylindrical helical thread; and a sleeve with an hollow interior that the channel carrier can fit within, said sleeve incorporating a cylindrical helical thread running along the interior walls of the sleeve, having grooves formed between the walls of cylindrical helical thread; whereby at least a portion of the channel carrier thread is configured to fit between at least a portion of the sleeve cylindrical helical thread. When the channel carrier is so fit within the sleeve, the groove between the walls formed by the thread in each of the channel carrier and the sleeve are positioned in proximity and alignment, so as to form a composite channel there-between. The composite channel geometry and configuration is consistent throughout the composite channel so formed.

For purposes of this document references to "composite channel" shall mean the channel formed in the space between the channel carrier and the portion of the sleeve that is positioned proximate to and facing the channel carrier when the channel is positioned within the sleeve, said channel therefore exists between the walls of cylindrical helical thread of the sleeve and/or the walls of the cylindrical helical thread of the channel carrier when the cylindrical helical thread of the sleeve and the cylindrical helical thread of the channel carrier mate or otherwise integrate, as described herein. The channel that is formed is therefore created by way of a composition of the elements of the sleeve and the channel carrier. As discussed herein, no seal is formed between the sleeve and the channel carrier elements that form the composite channel.

More specifically, the sleeve thread is formed such that when it is fit into the groove between the walls formed by the channel carrier thread, the sleeve thread does not fill the whole of said groove. The result is that there is a space between the edge of the sleeve cylindrical helical thread and the circular shaft of the channel carrier (and the groove between the walls formed by the cylindrical helical thread of the channel carrier). The space forms a spiraling composite channel. The composite channel has a channel length that is equivalent to the length of the cylindrical helical thread of the channel carrier that forms grooves of sufficient depth and/or geometry to form the composite channel. Liquid or gas may run through the composite channel or a portion thereof, in a helical direction, such as in a helical direction that is downstream from an inlet port formed in the sleeve.

The channel carrier is of a lesser height than the height of the sleeve, whereby height is measured between the ends of each of the sleeve and the channel carrier. The variant heights of these elements cause the channel carrier to only fit within a portion of the sleeve when the channel carrier is positioned inside the sleeve, such that a portion of the sleeve does not incorporate the channel carrier. When the channel carrier is rotated within the sleeve the channel carrier will move up and down the height of the sleeve, and thereby be moved to varying positions within the sleeve.

The direction that the channel carrier moves within the sleeve will depend upon the direction of the rotation of the channel carrier. The position of the channel carrier within the sleeve will depend upon the number of rotations of the channel carrier that occur. By rotating the channel carrier in a particular direction, the channel carrier may thereby be moved between a position whereby it is in the upper portion of the interior of the sleeve to a position whereby it is in the bottom portion of the interior of the sleeve, or vice versa. Rotations of the channel carrier in a particular direction may further cause the channel carrier to be positioned within the sleeve in any position between the upper and bottom portions of the sleeve. (The bottom portion of the sleeve being downstream of the valve inlet port.) The channel carrier remains stationary in a position when it is not being rotated.

The sleeve incorporates an inlet attached to a hole bored into the wall of the sleeve along the sleeve outer wall, opposite the sleeve inner wall. For example, the inlet may be positioned near the center of the wall of the sleeve, or in another position along the sleeve outer wall. The inlet may be attached to a port. The inlet allows for the flow of a fluid, for example, such as a gas or liquid or any other type of fluid, from the inlet into the interior of the sleeve.

The fluid will flow from the inlet through the interior of the sleeve towards an outlet formed in the bottom of the sleeve. (The outlet is downstream of the inlet.) The outlet may have a port portion attached thereto. The fluid will flow: (i) freely through any portion of the sleeve where the channel carrier is not positioned; and (ii) through the composite channel positioned between the inlet port and the outlet port, being the active channel length, if any. Therefore, whether the fluid does not flow through the channel carrier at all, or flows thorough all, or a portion of, the channel carrier, will depend on where the channel carrier is positioned within the sleeve in relation to the inlet.

As the fluid flows through the composite channel between the inlet port and the outlet port, incremental differentials of line loss pressure (differential pressure loss) occur. The result is that the position of the channel carrier (and the active channel length, if any) will affect the differential line loss pressure of flow of the fluid. The valve of the present invention provides a consistent relationship between pressure drop and rotational position of the valve, and thereby permits stability in industrial uses that are robotically automatically controlled. In particular, such a valve will be configured to achieve a specific range of applications (e.g., a range of flow (gpm) and a range of differential pressure loss) required for such industrial use. This consistency will persist throughout the length of a section of the composite channel formed between the channel carrier and the sleeve, wherein the channel volume (orifice) is consistent.

The position of the channel carrier within the interior of the sleeve can be altered manually, or in accordance with signals from a microprocessor in communication with the valve of the present invention (e.g., robotically). The valve of the present invention may be used as a balance valve, as a control valve, or as an integrated balancing and control valve. The valve of the present invention is a multi-turn valve operable to rotate within the sleeve through one or more turns of 360 degrees of rotation.

Embodiments of the present invention may be configured to incorporate various sensors. For example, one or more of the sensors may be operable to detect control variables, such as any of the following: air temperature, water temperature, relative humidity, and fluid flow. At least one sensor may also be operable to detect the location of the channel carrier within the sleeve. Collectively these sensors can be operable to detect fluid flow within the valve, as well as the position of the channel carrier within the sleeve. The detections of the one or more sensors may be relayed to the motor or a microprocessor device that is attached to or otherwise incorporated within (whether by a wired or wireless connection) the valve. The microprocessor may utilize this information to determine a position of the channel carrier within the sleeve that will achieve linear function based on the detection of one or more sensors. The microprocessor may then facilitate the operation of the motor to rotate the channel carrier from its position to the determined position. The microprocessor may also be operable to display data and information relating to the sensors and the valve to a valve operator or other user.

If the valve is a manually operated valve, the valve operator or other user may utilize the information displayed by the microprocessor to determine the rotation of the channel carrier that should be performed manually to achieve a particular differential pressure loss across the valve, such achievement being a function of the valve. A lever may be incorporated in the valve for the purpose of being used to achieve the manual rotation. Moreover, embodiments of the valve that are robotically operated may also incorporate such a lever that may be used should robotic rotation fail, or should a manual override option be chosen for a robotically operated valve, whereby robotic operation is overridden and manual rotation of the channel carrier can be undertaken.

One embodiment of the present invention is a valve that produces a variable differential pressure loss linearly proportional to the active channel length of the cylindrical helical channel of said valve, with the specific proportionality (gain) being a function of one or more of the following: the material the valve elements are formed of; the channel volume (orifice) cross-sectional geometry and dimension; the maximum design flow specific to an industrial use wherein the valve is utilized (e.g., a fluid distribution system, HVAC, a machine, or other systems) as each valve may be designed to achieve a range of applications, namely a range of flows each of which is specific to the one or more industrial uses wherein the valve may be utilized (each such flow being an application specific flow); the diameter of the cylindrical helical composite channel formed between the channel carrier and the sleeve; characteristics of the fluid that flows through the valve; as well as other factors relating to the configuration, construction and industrial use of the valve.

Embodiments of the present invention may be configured using a range of common manufacturing processes, and therefore the manufacture of the embodiments of the valve of the present invention does not require any specialized or unique manufacturing apparatus.

The valve of the present invention is formed to incorporate a fixed composite channel geometry that is constant throughout the length of the composite channel that is formed between the channel carrier and the sleeve within the valve. The geometry of the composite channel of embodiments of the valve of the present invention may vary.

Two differential pressure loss valves of the present invention having identical composite channel lengths and geometries may therefore be used to achieve different outcomes by positioning the channel carrier of each valve in a different position within the sleeve of each valve. The different positioning of the channel carrier in each valve causes each of the valves to incorporate a different active channel length and to therefore achieve different effects and functions, as described herein.

In embodiments of the present invention the channel carrier may be positioned with the sleeve to produce a fully closed valve and in such a position the active channel length may be equivalent to the full channel length possible in the channel carrier. The full channel length is therefore equivalent to the total length of the groove between the walls formed by the thread in the outer surface of the channel carrier that can possibly be incorporated as part of a composite channel.

The valve of the present invention may incorporate multiple shaft rotations to provide an extended range of differential pressure loss. Such range can be in excess of 20 to 1 (20:1) where 1 represents the differential pressure loss at the industrial use and related application specific maximum design flow rate in a near to fully open valve position (e.g., a 90-95% fully open position). A near to fully open valve position is achieved through the positioning of the channel carrier within the sleeve such that the valve is almost at the farthest possible position from the position of the channel carrier when the valve is in a closed position, as described herein.

Embodiments of the present invention are suitable to operate in various fluid distribution systems where numerous valves are required to operate independently to maintain specific differential pressure loss levels. Specific differential pressure loss level may be required to be achieved in relation to changes in fluid distribution demands within said fluid distribution systems. For example, such distribution systems may include heating ventilation and air conditioning (HVAC) systems and various industrial processes that incorporate multiple independent valves.

In a robotic industrial use, the valve of the present invention may be used as a replacement for two independent prior art valves that are required to operate within the same conduit of a fluid distribution system, such as a manually adjusted balancing valve and a robotic control valve. The valve of the present invention may achieve the required functions of the aforementioned two prior art valves. Thus, embodiments of the valve of the present invention can constitute a valve that functions to achieve the differential pressure loss required of both the balancing valve and the robotic control valve.

In particular, such a valve of the present invention is operable to achieve the functionality of the prior art balancing valve, and this use enables the operation of the fluid distribution system with other robotic processes to facilitate the pump of the fluid distribution system to function so as to achieve the optimum pump energy consumption. Furthermore, the labour cost of the manually adjusted prior art balancing valves is eliminated by the robotic process achieved by the valve of the present invention.

Embodiments of the present invention valve may be formed of a variety of materials, for example, such as one of the following, or a combination of the following: brass, nylon, polypropylene, or other materials.

The helical cylindrical thread of the outer surface of the channel carrier and the helical cylindrical thread of the inner surface of the sleeve, or portions thereof, may be in close contact when the channel carrier is within the sleeve, but there is no sealing contact formed there-between in the present invention. The fluid will primarily flow in the channel formed in the grooves between the walls formed by each of the thread in the channel carrier and in the sleeve, as described herein. However, leakage of fluid may occur from the composite channel into gaps between such threads, and such leaked fluid can create lubrication that assists in both the operation of moving the channel carrier within the sleeve, and the removal of debris from within the composite channel. Debris may have entered the gaps because it was mixed with, and otherwise integrated in, fluid that previously entered the valve and flowed through the composite channel, whereby debris separated from the fluid with the result that the debris was deposited within the composite channel, and within the gaps.

The removal of debris that is generated and a result of the leakage of fluid has the benefit of avoiding clogging of the valve. This is a benefit of the present invention over the prior art, as prior art valves clog, and clogging can cause problems for the function of a valve, such as increased wear and tear, backup of fluid, diminished fluid flow that effects the efficiency of the valve function, and the need for costly cleaning of the valve. The valve of the present invention functions to avoid such problems as the fluid leakage acts to avoid clogging of the valve.

The valve of the present invention functions in a manner that produces a low coefficient of friction between the sleeve and the channel carrier. The effect thereof is that a lower drive energy is required to be applied by an actuator to the valve of the present invention than is necessary to be applied to prior art valves.

The present invention offers other benefits over the prior art, including that it does not require a threaded section therein to be in direct contact with any motor assembly in order for the valve to be operable. The present invention channel carrier is moveable to various positions either robotically or manually within the sleeve. A threaded section required to be in direct contact with a motor assembly in prior art valves can lose effectiveness due to wear and tear over time. The present invention therefore is not as susceptible to wear and tear as prior art valves, and will not suffer the breakage and loss of effective function that prior art valves will experience.

The present invention further does not require any seals, such as O-rings or similar elements to function, as are required by prior art valves. As discussed herein, there may be some leakage of fluid within the present valve, however, the present invention is configured such that such leakage is limited to an acceptable level that does not affect the function of the valve of the present invention, and that can assist in the function of the valve of the present invention, as is disclosed herein.

The application of the valve of the present invention to robotic industrial uses produces a consistent linear gain that provides: the opportunity for stable operation based on linear transfer function, that is the constant linear gain of differential pressure loss as a function of active channel length; avoidance of a need for an electronic compensating convertor to be incorporated in the actuator; and a reduction of commissioning costs for said robotic systems compared to that required for prior art valves utilized in robotic industrial uses.

The valve of the present invention, having consistent linear gain characteristics and simple transfer function, may be modeled easily and applied in a simulation, or modeling, process of a fluid distribution system more easily than prior art valves that each have unique non-linear characteristics.

Embodiments of the present invention are shown in the drawings, and a skilled reader will recognize that the drawings provide some examples of possible embodiments of the present invention, but are not exhaustive of such embodiments. Other embodiments of the present invention are therefore possible.

FIG. 1 shows an example of one round of a composite channel, namely a composite channel round 102, as is formed by the combination of the cylindrical helical threads formed in the inner surface of the sleeve and the outer surface of the channel carrier and the grooves formed between such thread walls. Fluid can flow into the composite channel through the starting point 103, and within the composite channel, in the direction indicated by arrow A. The composite channel incorporates one or more bends 100, that may be consistent (such as to form a circular configuration in the round), or virtually consistent, such as to form an oblong configuration in the round. The bends are shaped in cylindrical manner such that the ending point 104 of each round is incrementally distant from the starting point, so as to form a continuous composite channel. In a circular-shaped round, the distance of all of the outer edges of the composite channel are a set and constant distance from the center point of the diameter 101 formed by the round. In an oblong circular-shaped round, or other shaped rounds, the distance of the edges may not be a constant distance from the center point of the diameter formed by the round, but each oblong is of a consistent diameter.

The fluid flows through the round in the direction indicated by arrow B. The composite channel (formed between the sleeve and the channel carrier as described herein) may have varying internal shapes (geometries) in different embodiments of the present invention, but each embodiment is configured such that the composite channel therein has a consistent and constant cross-section through each round that the composite channel is configured to incorporate. Furthermore, the cross-sections of each and all rounds in a composite channel are constant and consistent.

The cross-sectional area of the internal channel and the diameter of the each round has a direct impact on the differential pressure loss between the starting point 103 and ending point 104 of each round. Specifically, the flow of fluid through an incremental length 105 of the composite channel, will generate an incremental differential pressure loss across the incremental length of the composite channel. An incremental length of the composite channel could also be represented by a round. Thus, an incremental length of the composite channel is a round or any portion thereof that comprises a portion of the composite channel. The composite channel has consistent incremental different pressure loss, whereby each increment is represented as an incremental length of the composite channel.

The composite channel is formed of multiple incremental lengths. The incremental length 105 in FIG. 1 is shown as a representative example of one of such incremental length. In an embodiment of the present invention wherein all incremental lengths of the composite channel are physically identical, the sum total of all equal incremental lengths is equal to the length of composite channel. If the fluid has an equal flow rate through each incremental length of the composite channel, the sum total of the differential pressure loss within the incremental length of the composite channel is equal to the total differential pressure loss across the full composite channel length. At any specific fluid flow rate the differential pressure loss between staring point 103 and ending point 104 of the composite channel has a linear relationship with the composite channel length.

Figure 2:
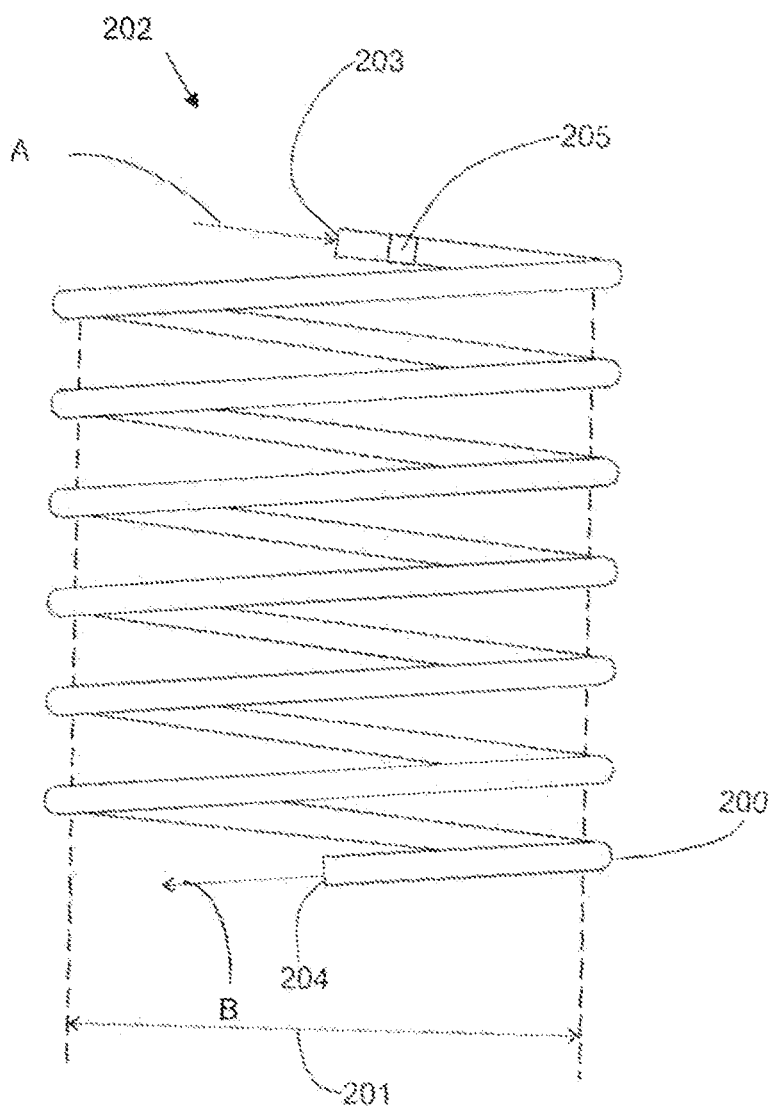
FIG. 2 is a representational view of a portion of the composite channel comprising an internal helical channel, that shows multiple helical rotations of such a composite channel of a valve of an embodiment of the present invention.

As shown in FIG. 2, multiple rounds may be incorporated in the composite channel 202 that is formed of the combination of the channels existing in the grooves between the walls formed by the cylindrical helical thread incorporated in each of the inner surface of the sleeve and the outer surface of the channel carrier. Such channels combine when the channel carrier is positioned within the sleeve into a space that constitutes a composite channel, as described herein. The composite channel is formed of multiple identical rounds connected in series, and such multiple rounds form a cylindrical helical form. Thus the composite channel is continuous and is formed of composite channel rounds that are configured in a cylindrical helical form. Fluid flowing from the inlet channel in the sleeve enters the composite channel, such as through a starting point 203 and flows in the direction shown by arrow A. The fluid flows through the composite channel, or a portion thereof, and exits the composite channel after passing through the last round 200 at an ending point 204 while flowing in the direction shown by arrow B. The fluid may ultimately exit the valve through an outlet port in the valve.

All of the rounds of composite channel 202 have a constant, fixed diameter 201. The composite channel further has a constant cross-section throughout the length of the cylindrical helical formed composite channel. The cylindrical helical form has significant attributes applicable to the present invention, as discussed herein.

As the fluid flows through an incremental length 205 of the composite channel, it will generate an incremental differential pressure loss across the incremental length of the composite channel.

The composite channel is formed of multiple incremental lengths. The incremental length 205 is shown as a representative example of one of such multiple incremental lengths. In an embodiment of the present invention wherein all incremental lengths are physically identical, the sum total of all equal incremental lengths is equal to the length of composite channel. If the fluid has an equal flow rate through each incremental length of the composite channel length the sum total of increment differential pressure loss of the composite channel is equal to the total differential pressure loss across the total of the composite channel length. At any specific flow rate of the fluid flowing within the composite channel, the differential pressure loss between the starting point 203 and ending point 204 of the composite channel has a linear relationship with the composite channel length.

Figure 3:
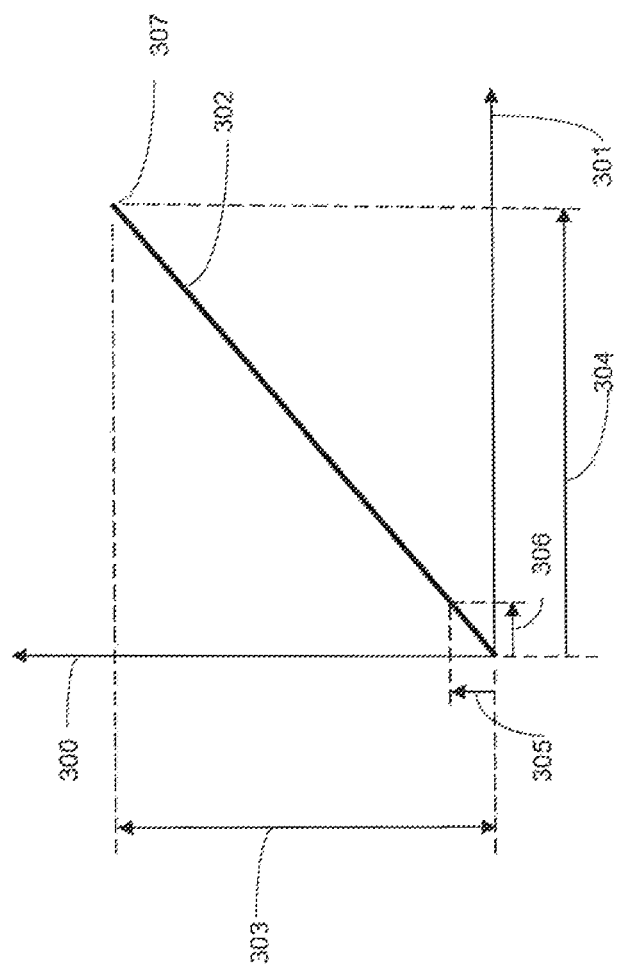
FIG. 3 is a graph showing the effect upon differential pressure loss created by each of differential pressure and the length of a channel, as occurring within a valve of an embodiment of the present invention.

FIG. 3 shows the effect of variations in the active channel length of the composite channel. As discussed herein, variations in the position of the channel carrier in relation to the inlet port in the sleeve can alter the active channel length. In some embodiments of the present invention, the position of the channel carrier may be robotically changed during the application of the invention. The position of the channel carrier may also be manually altered.

The relationship between the active channel length and differential pressure loss of the composite channel can be illustrated mathematically as:

At a constant flow of "f" gallons per minute (gpm) through an incremental length of the composite channel (Inc.arc) an incremental amount of differential pressure loss (Inc.DPL) is generated.

$$\text{Inc.DPL} = K * \text{Inc.arc}$$

Where K is a specific physical constant, K may be derived empirically, and is dependent on flow, dimensions and geometry of composite channel cross-section, the material from which the composite channel is formed, and diameter of each round of the cylindrical helical form, etc.

When the same flow "f" passes through a number "n" of identical arc lengths "Inc. arc" that are linked in a series then the following applies;

$$n*\text{Inc.DPL} = n*K*\text{Inc.arc} = K*(n*\text{inc.arc})$$

and when Active Channel Length (ACL) is the sum of a number "n" of arc lengths (Inc.arc) then;

$$\text{ACL} = n*\text{Inc.arc}$$

and if total differential pressure loss (DPL) is equal to the sum of a number "n" of incremental differential pressure loss (Inc.DPL) then:

$$\text{DPL} = n*\text{Inc.DPL}$$

Then as a result of the foregoing:

$$\text{DPL} = K*\text{ACL}$$

The linear relationship described above is shown in the graph of FIG. 3, wherein the vertical axis 300 indicates differential pressure loss (measured in pounds per square inch (psi)) and the horizontal axis 301 indicates active channel length of a composite channel (as can be measured in inches, centimeters or some other distance measurement).

An incremental length of a composite channel that incorporates a differential pressure indicated by 305 and an active channel length indicated by 306, will experience the same differential pressure loss trajectory as a composite channel having the differential pressure indicated by 303 and the active channel length indicated by 304 that experiences a differential pressure loss trajectory indicated by reference 307 on locus 302.

The cylindrical helical form of the composite channel of the present invention assists with the achievement of the characteristic of "Linearity" of the invention. The cylindrical helical form further provides "an economy of space" to the invention. To change the active channel length in the present invention a method must be provided for changing the position of the channel carrier in relation to the inlet port within the sleeve. The cylindrical helical form of the channel carrier facilitates a consistent rotation thereof, and such rotational action alters the active channel length existing in the space between the inlet port and outlet port.

The rotation of the channel carrier is implemented by use of the thread on the channel carrier. When the channel carrier is fit within the sleeve, a portion of the channel carrier thread mates or otherwise integrates with a portion of the thread formed on the inner surface of the sleeve. This rotatability of the channel carrier has the effect that it is not necessary for the valve of the present invention to incorporate, or be attached to, an independent mechanism to execute the movement of the channel carrier within the sleeve. The movement of the channel carrier within the sleeve is by way of rotation, and such movement causes the channel carrier to be positioned in varying positions within the sleeve.

Figure 4A:
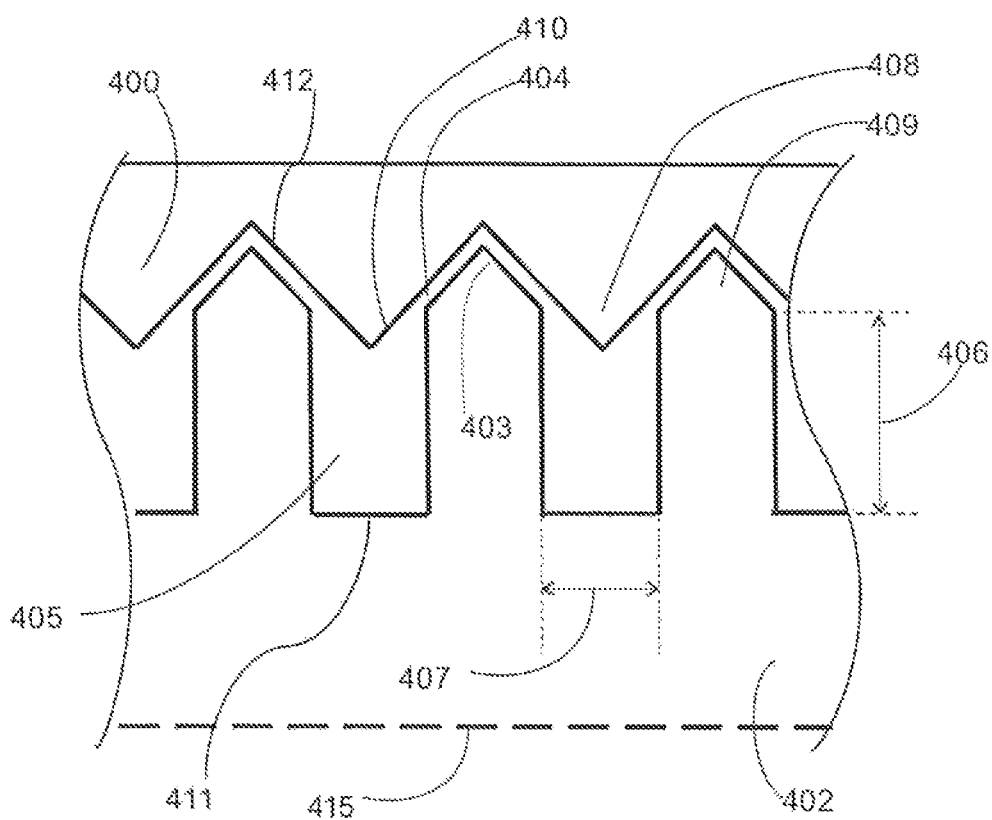
FIG. 4A is a sectional view of a combination of a channel carrier and a sleeve of a valve, where-between the composite channel is formed, as incorporated in an embodiment of the present invention.
Figure 4B:
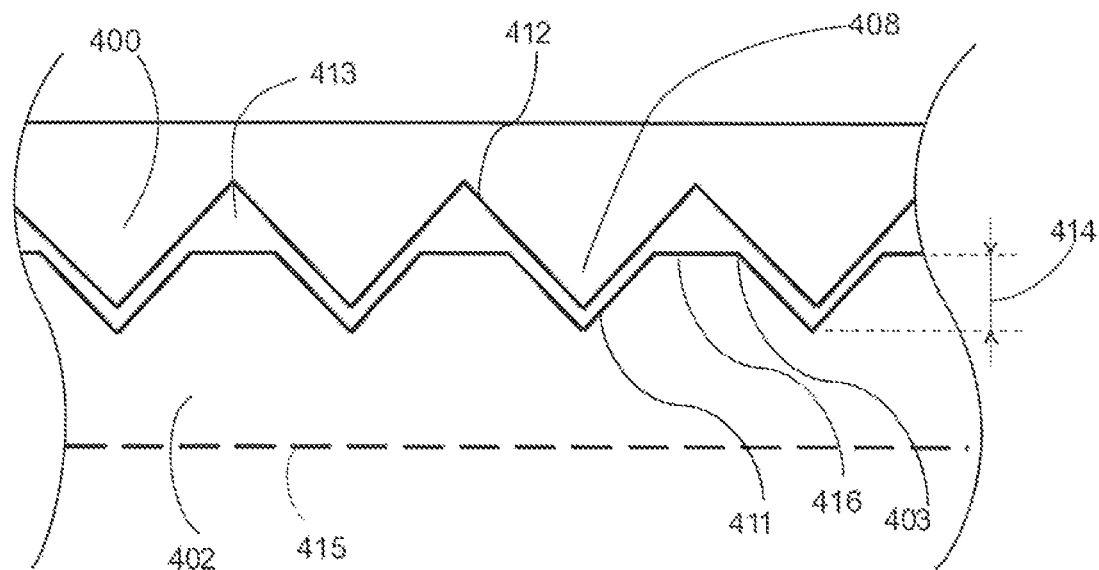
FIG. 4B is a sectional view of a combination of a channel carrier and a sleeve of a valve, where-between the composite channel is formed, as incorporated in an embodiment of the present invention.
Figure 4C:
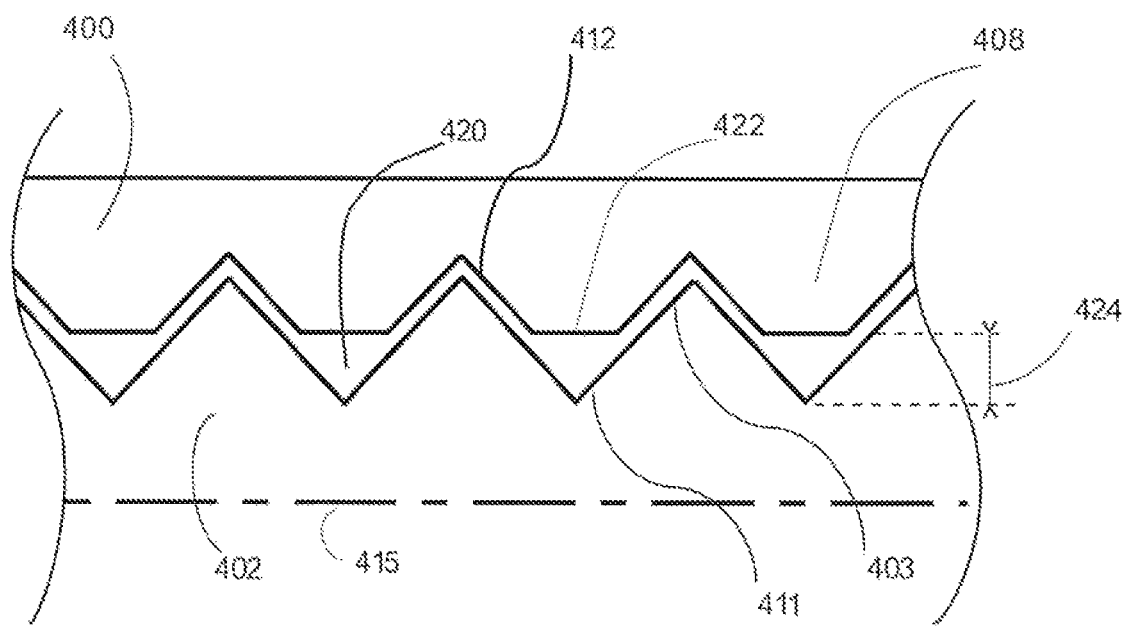
FIG. 4C is a sectional view of a combination of a channel carrier and a sleeve of a valve, where-between the composite channel is formed, as incorporated in an embodiment of the present invention.

The intended integration or mating of the channel carrier thread and the sleeve thread is reflected in the configuration of each of the channel carrier thread and the sleeve thread. Specifically the thread formed in the channel carrier, or a portion thereof, is configured to integrate and otherwise mate with the thread formed in the sleeve, or a portion thereof, and the sleeve thread is also configured for its mating or other integration with the channel carrier thread. Examples of such integration or mating of threads is shown in FIGS. 4A, 4B and 4C. The non-integrated thread surface of the sleeve is used to guide the channel carrier through the sleeve as it moves between positions within the sleeve. This integration and mating has the effect of aligning the sleeve and the channel carrier such that the channel carrier is positioned within the sleeve in a manner that creates the same composite channel. Such integration and mating further causes the composite channel to be formed to have a specific channel shape and cross-section (geometry), and for such channel shape and cross-section to be consistent throughout the composite channel.

As discussed herein the shape and the cross-section of the composite channel have an effect upon the linearity and function of embodiments of the valve of the present invention. The integration and mating of the threads is sufficient to: generate the required alignment of the sleeve and channel carrier; allow such alignment of the sleeve and channel carrier elements; through alignment, to form the shape and cross-section of the composite channel; and to maintain such alignment, and such shape and cross-section, as the channel carrier moves to varying positions within the sleeve.

Some prior art valves incorporate a second helical thread assembly whereby a sleeve and an element fitted therein are integrated and mated. In such prior art valves, the connection whereby a channel may be formed is not sufficient to align and maintain alignment of the sleeve and the element there-within. In the prior art valves a second helical thread assembly is required to achieve alignment of the sleeve and the element within the sleeve.

The valve of the present invention does not require a secondary helical thread assembly to align the channel carrier within the sleeve. Alignment is created and maintained in the present invention, even when the channel carrier is moved to varying positions within the sleeve, by the integration or mating of the threads of each of the sleeve and channel carrier, between which the composite channel is formed. It is therefore a benefit of this configuration of each of the thread of the channel carrier and the thread of the sleeve of the present invention, that a second or any number of additional, separate, sets of threads are not needed to be formed in either the channel carrier and/or the sleeve to guide the channel carrier as it moves between varying positions within the sleeve.

The channel carrier thread facilitates a cylindrical helical location of the channel helical form. The cylindrical helical thread of the channel carrier is configured to support a relationship between itself and the cylindrical helical thread of the sleeve. Rotational motion of the channel carrier within the sleeve facilitates the movement of the channel carrier within the sleeve by propelling the channel carrier within the sleeve while maintaining consistent geometric shaping throughout the whole of the composite channel.

The graph of FIG. 3 shows differential pressure loss as a function of active channel length. At flow level "f" the ratio of the pressure incremental value 305 of differential pressure loss to the active channel incremental value 306 of active channel length represents the value of "K", in accordance with the following linear equation:

$$K = \text{differential pressure loss/channel length}$$

The value of K may be described as the "gain" of the valve.

When the differential pressure loss value 303 is shown as a function of the active channel length value 304, the result is the same value of "K" in the linear equation. As a result, locus 302 represents the following linear equation:

$$K = \text{differential pressure loss/channel length}$$

The value of K is constant along the locus 302.

When the active channel length is at 100% of its physical length (whereby the whole of the length of the grooves between the walls formed by the cylindrical helical thread formed in the channel carrier are incorporated in the active channel length), as represented by 304, the maximum differential pressure loss, as represented by 303, is achieved, at the end point 307 of the locus 302.

The value of K is a function of all of the following: composite channel shape and cross-sectional geometry, channel carrier and sleeve materials, and the value of the industrial use application specific flow rate.

The consistent linearity of the differential pressure loss within the active channel length is a significant characteristic of the present invention. This consistent linearity enhances the long term stable manipulation of the channel carrier within the sleeve to adjust active channel length, and reduces associated set-up and maintenance labour costs, in embodiments of the present invention.

In embodiments of the present invention that are attached to a mechanism operable to perform robotic adjustments of the position of the channel carrier within the sleeve, there is no need for the industry tool for determining the robotic adjustment to be applied to the channel carrier in the prior art valves (the proportional integral derivative (PID) algorithm). For prior art valves wherein the interior channel cross-section area or geometry changes along the length of the channel length, the linearity will be lost, and adjustments will be necessary to compensate for this change. The result is that custom modification is required to perform each adjustment of the element within a sleeve in a prior art valve to react to the change. The present invention does not necessarily require a PID algorithm due to the linearity of such invention, as is described herein. The benefit of this aspect of the present invention is that use of a PID algorithm requires significant cost to customize such PID algorithm that is to be used, and this is not required for the present invention. Thus, the present invention does not require an expenditure for a PID algorithm and thereby saves costs for a user.

FIG. 4A depicts a radial wafer view of a section of valve that incorporates the channel carrier within the sleeve. It thereby shows an embodiment of the present invention wherein the channel carrier 402 is fitted within the sleeve 400. The composite channel is formed through the alignment of the groove formed in the channel carrier between the walls formed by the cylindrical helical thread therein, namely the channel carrier cylindrical helical groove 411 formed in the outer surface of the channel carrier, and the groove formed in the sleeve between the walls formed by the cylindrical helical thread therein, namely the sleeve cylindrical helical groove 412 formed in the inner surface of the sleeve 400. The groove that is so incorporated in the composite channel is continuous. The composite channel is formed between the grooves in the channel carrier and the sleeve, and fluid may flow within the space between such grooves (the space forming the composite channel). The composite channel is continuous, and is formed of multiple connected composite channel rounds. The groove cross-section of width 407 and height 406 is consistent for each composite channel round and for the whole of the composite channel. The composite channel is formed to be continuous and helical.

In FIGS. 4A, 4B and 4C the mid-point of the diameter of the channel carrier is shown as reference 415. This point is also the axis of rotation of the channel carrier.

The composite channel cross-section may be configured such that the composite channel extends farther towards the sleeve than towards the channel carrier (meaning the composite channel is primarily positioned within a groove in the sleeve, and between the walls formed by the cylindrical helical thread of the sleeve) in some embodiments of the present invention, as shown in FIG. 4B, or towards the channel carrier (meaning the composite channel is primarily positioned within a groove in the channel carrier, and between the walls formed by the cylindrical helical thread of the channel carrier) in other embodiments of the present invention, as shown in FIGS. 4A and 4C. Embodiments of the present invention may further be configured such that the composite channel cross-section extends in equal measures toward the sleeve and the channel carrier.

The configuration of the integration of the cylindrical helical thread of the sleeve and the cylindrical helical thread of the channel carrier, or portions thereof, will determine whether this is one element (the sleeve or the channel carrier) wherein the composite channel primarily extends or its otherwise situated, or whether the composite channel is equally positioned within the groove between the walls formed by the cylindrical helical thread in the sleeve and the groove between the walls formed by the cylindrical helical thread in the channel carrier.

As shown in FIG. 4A, there is no seal formed between the helical threads or the helical grooves of the each of the channel carrier and the sleeve. Gaps 404 may exist between the outer surface 403 of the channel carrier and the inner surface 410 of the sleeve where the surfaces are positioned in the closest proximity. Such gaps are configured to create a significant restriction to the passage of fluid through the gap, however, some minimum fluid flow may bypass the composite channel nearest to the gap and flow into the gap.

Embodiments of the present invention that are attached to an actuator assembly, may experience torque provided by an actuator motor that assists to minimize this gap and any flow of fluid into such gap. The same effect may occur elsewhere. The effect occurs on all cylindrical helical thread surfaces of the channel carrier and all cylindrical helical thread surfaces of the sleeve. The mating, integration and/or engagement of the cylindrical helical threads of each of the channel carrier and the sleeve, occurs when the channel carrier is positioned within the sleeve and at least a portion of the cylindrical helical thread of the sleeve is engaged with at least a portion of the cylindrical helical thread of the channel carrier.

Leakage of fluid from a groove between the cylindrical helical thread in either the channel carrier or the sleeve can occur due to the tolerance of such cylindrical helical threads, and such leakage may form a bypass flow path parallel to the nearest composite channel round. Such bypass flow path is not significant and will be very small in the present invention. For example, such bypass flow path flow may be 1% or less in embodiments of the present invention. The bypass flow path leakage is a consistent addition to the flow of fluid through the composite channel cross-section. This is one of the reasons why "O" rings or other sealants are not required in the present invention. Leakage into any gap in the present invention can be utilized for several purposes, as described herein.

FIGS. 4A, 4B and 4C depict examples of the possible geometries and locations of the composite channel rounds as are formed by grooves relative to the walls shaped in the channel carrier by the cylindrical helical thread 403 and to walls shaped in the sleeve by the cylindrical helical thread 408. The sleeve cylindrical helical thread fits within a portion of the channel carrier groove (formed between the walls formed by the channel carrier cylindrical helical thread), and the channel carrier cylindrical helical thread fits within a portion of the sleeve groove (formed between walls formed by the sleeve cylindrical helical thread). Depending upon the shape of the channel carrier and the sleeve, and the cylindrical helical thread formed in each of those elements, the composite channel may extend father towards the channel carrier, as shown in FIG. 4A, or father towards the sleeve, as shown in FIGS. 4B and 4C, or be positioned an equal distance between the sleeve and the channel carrier. Moreover, as shown in FIGS. 4A and 4C, the channel carrier cylindrical helical thread 403 may be in closest proximity to the sleeve groove 412, whereas in FIG. 4B the sleeve cylindrical helical thread 408 may be in closest proximity to the to the channel carrier groove 411.

Manufacturing process considerations, material considerations, and channel cross-section considerations may favour specific configurations of cylindrical helical threads and grooves between the walls formed by such threads to produce the desired composite channel for embodiments of the present invention. As discussed herein, the geometric configuration of the cylindrical helical threads formed in each of the sleeve and the channel carrier, and the shape of the grooves formed therein (between the walls of the cylindrical helical thread in each of the channel carrier and the sleeve) can alter the location of the composite channel in relation to the channel carrier and sleeve, where-between the composite channel is formed.

FIG. 4B shows an alternate composite channel location to the composite channel location shown in FIG. 4A. In particular, FIG. 4B depicts a radial wafer view of a section of a present invention valve that incorporates the channel carrier within the sleeve. All of the embodiments of the present invention shown in FIGS. 4A, 4B and 4C, and other embodiments of the present invention, will have characteristics of linearity as are discussed herein.

The amount of fluid that can simultaneously flow through a composite channel will be affected by the geometry of the composite channel. For example, a lesser volume of fluid can simultaneously flow through the sleeve groove 413 portion of the composite channel of FIG. 4B than through channel carrier groove 405 portion of the composite channel of FIG. 4A. The cross-section of the composite channel therefore affects the differential pressure loss across the composite channel, such that the greater the volume of fluid that can simultaneously flow through the composite channel rounds of the composite channel the lower the differential pressure loss across the composite channel, and the lesser the volume of fluid that can simultaneously flow through the composite channel rounds of the composite channel the greater the differential pressure loss within the composite channel.

As shown in FIG. 4B, composite channel rounds (each round being indicated by an individual depicted groove, such as sleeve groove 413) may be formed between the sleeve channel and the channel carrier cylindrical helical thread 403. The channel carrier cylindrical helical thread may have various configurations, for example, as shown in FIG. 4B, it can be formed to incorporate a flat top section 416. The cross-section of the channel carrier cylindrical helical thread may be configured to have a consistent height 414. Such consistent cross-section features within each round of the composite channel creates a consistent cross-section for the combination of composite channel rounds that form the composite channel.

FIG. 4C shows yet another an alternate composite channel location to the composite channel location shown in FIG. 4A. It further shows an alternate composite channel location to the composite channel location shown in FIG. B.

FIG. 4C depicts a radial wafer view of a section of valve that incorporates the channel carrier within the sleeve. Embodiments of the present invention shown in FIGS. 4A, 4B, and 4C, as well as other embodiments of the present invention, will have characteristics of linearity as are discussed herein.

As shown in FIG. 4C, the composite channel rounds (each round being indicated by an individual portion of the groove that is a wrap of the groove around the channel carrier, such as channel carrier groove 420) may be formed between the sleeve cylindrical helical thread and the channel carrier cylindrical helical thread. The sleeve cylindrical helical thread may have various configurations, for example, as shown in FIG. 4C, it can be formed to incorporate a flat top section 422. The cross-section of the channel carrier cylindrical helical thread may be configured to have a consistent height 424. Such consistent cross-section features within each round creates a consistent cross-section for each of the combined composite channel rounds.

A skilled reader will recognize that FIGS. 4A, 4B and 4C depict only some examples of possible configurations of sleeve cylindrical helical threads and channel carrier cylindrical helical threads, and the possible geometries of composite channels that can be formed there-between.

In embodiments of the present invention, the width of all channels is carefully selected as is the height thereof, to create an optimum composite channel for the flow of fluid, and to ensure structural integrity of the cylindrical helical threads, while satisfying the need for a specific channel cross-sectional area. What constitutes an optimum composite channel may be determined in accordance with the industrial use that the valve incorporating such composite channel is to be utilized within (e.g., HVAC, a machine, etc.) and the applications relating thereto (e.g., ranges of flow (gpm) and ranges of differential pressure loss). No matter the geometrical differences in the configuration of composite channel rounds within embodiments of the present invention, all embodiments are formed to retain the structural integrity of the cylindrical helical threads of each of the channel carrier and the sleeve. The composite channel cross-sectional area, related dimensions, shape, and geometry, and maximum design flow are all fixed and constant along the whole and entirety of the composite channel for each embodiment of the present invention, thus ensuring the linearity between differential pressure loss and channel length.

The cylindrical helical threads of each of the channel carrier and the sleeve are configured to support a relationship there-between that facilitates conversion of rotational motion to linear motion of the channel carrier, as well as facilitate linearity of the composite channel. Rotational motion of the channel carrier causes the channel carrier cylindrical helical thread to move into, through, and back out of, the sleeve channels, and to generate varying active channel lengths between the input port and output port, in accordance with each rotation.

Figure 5:
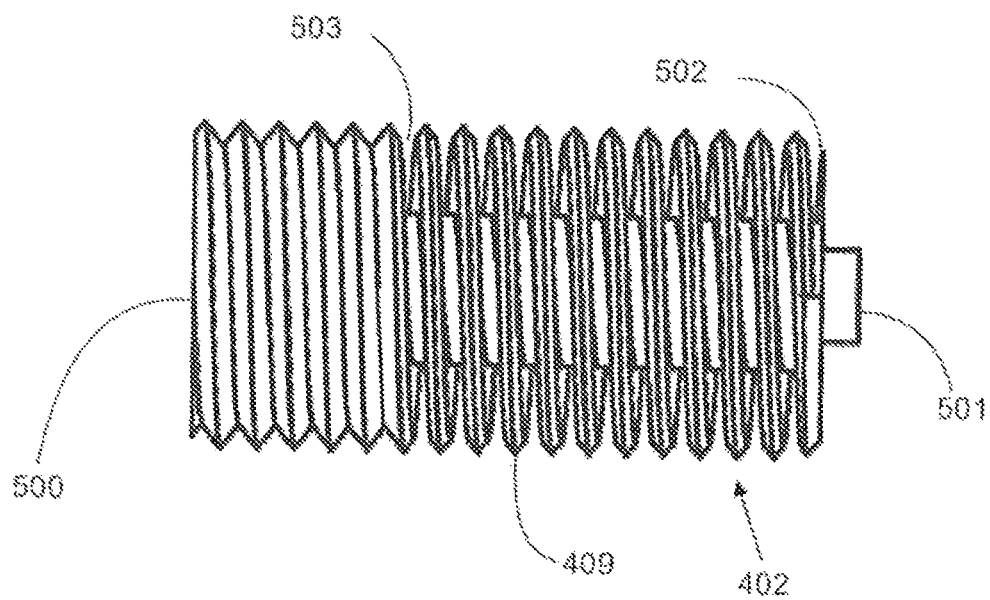
FIG. 5 is a perspective view of a channel carrier of an embodiment of the present invention.

FIG. 5 shows a channel carrier 402 of the present invention. The channel carrier is configured to incorporate a cylindrical helical channel formed upon the outer surface thereof in the groove between the walls of the cylindrical helical thread formed upon the outer surface of the channel carrier. The channel carrier thereby incorporates a continuous groove and a continuous cylindrical helical thread 409 along its outer surface. Embodiments of channel carriers of the present invention may incorporate: a cylindrical helical thread of different lengths upon the outer surface; the rounds of such thread may be placed so that the walls formed by such thread are at different distances from each other; and the thread may be formed to be of a different heights in varying embodiments. Thus in embodiments of the present invention, the grooves formed between the walls of the cylindrical helical thread of channel carriers may be formed to have variant depths, variant widths, and variant spacing.

One embodiment of a channel carrier of the present invention may incorporate a cylindrical helical thread that creates a groove and each wrap of the groove around the circumference of the channel carrier forms one of the multiple composite channel rounds formed along the entire length of the channel carrier. Other embodiments of the channel carrier of the present invention may incorporate such a groove, and composite channel rounds formed therefrom, formed on only a portion of a channel carrier.

As an example, FIG. 5 shows, the cylindrical helical thread formed in a channel carrier that is configured to generate a groove that forms a continuous composite channel therein may start at beginning point 502 and end at finish point 503. A portion of the channel carrier may not be configured to form a groove operable to be incorporated in the composite channel, for example, such as the portion between finish point 503 and termination end 500. When such a channel carrier as shown in FIG. 5 is positioned within the sleeve, only the portion of the channel carrier having a thread section between beginning point 502 and finish point 503 will form a portion of the continuous composite channel when the channel carrier is fit within the sleeve.

Figure 6:
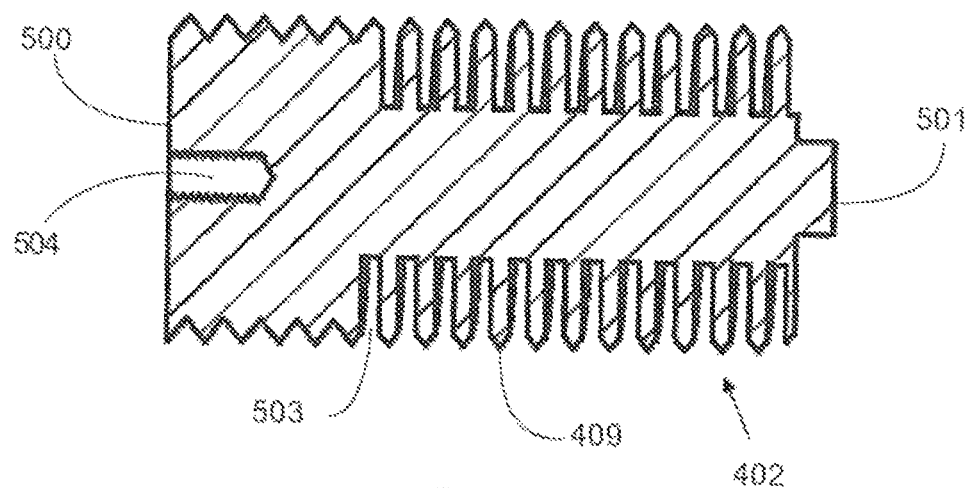
FIG. 6 is a cross-sectional view of a channel carrier of an embodiment of the present invention.

FIG. 6, that shows a cross-sectional view of the channel carrier 402, depicts an example of the walls formed by the channel carrier cylindrical helical thread 409. The channel carrier cylindrical helical thread is configured to create a groove between such walls. Each wrap of the groove around the circumference of the channel carrier creates a round that forms a portion of a composite channel when the channel carrier is within the sleeve. The groove is continuous upon the channel carrier. When the channel carrier is fit within the sleeve, the composite channel that is formed between the sleeve and the channel carrier is continuous, formed partially of such groove. The composite channel is positioned between the closing disc surface 501 and the finish point 503 within the valve when the valve is assembled. The thread section formed in the channel carrier that does not form any part of the composite channel, being the non-composite channel carrier thread section (as are shown to be positioned between finish point 503 and termination end 500 in FIG. 5), is a channel carrier thread section that is not configured to create a groove operable to form a portion of the composite channel when the channel carrier is fit within a sleeve.

The channel carrier may incorporate a closing disc surface 501 that is engageable with a closure surface within the valve housing, said closure surface being located at the output port. When so engaged the valve will be closed, and fluid flow will be prevented from exiting the valve via the output port.

Figure 8:
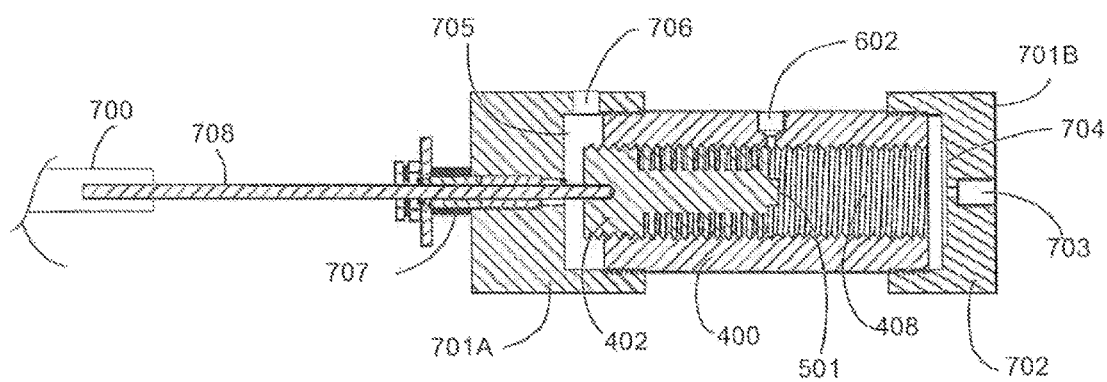
FIG. 8 is a cross-sectional view of a valve assembly of an embodiment of the present invention.

Embodiments of the present invention may be integrated with an actuator assembly (an example of such an embodiment is shown in FIG. 8). As shown in FIG. 6, at the one end of the channel carrier, such as the termination end 500, a threaded hole 504 is formed within the channel carrier. The threaded hole is configured to engage, integrate and mate with the threaded end of a drive stem of an actuator assembly. The engagement of the drive stem with the threaded hole forms a fixed mechanical connection between the channel carrier and the actuator assembly.

Figure 7A:
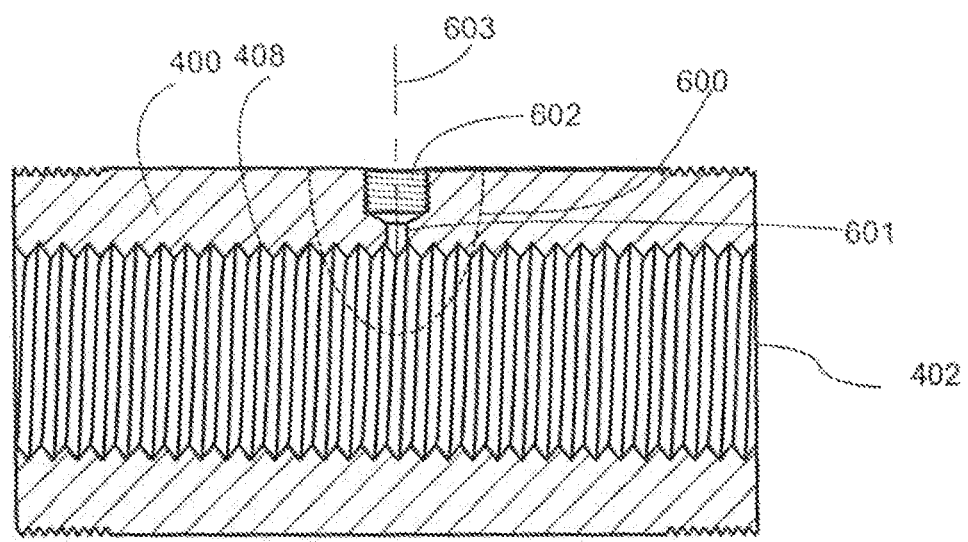
FIG. 7A is a cross-sectional view of a portion of a channel carrier positioned within a portion of a sleeve of an embodiment of the present invention.

As shown in FIG. 7A (that depicts a portion of the sleeve), the channel carrier 402 is fit within at least a portion of the sleeve 400 when the valve of the present invention is assembled. The sleeve incorporates an inlet port 602, whereby fluid may flow into the internal section of the sleeve. The inlet port may be positioned such that fluid will flow from the inlet portion of the sleeve into a composite channel portion 604 (shown in FIG. 7B) formed between the sleeve and the channel carrier.

Figure 7B:
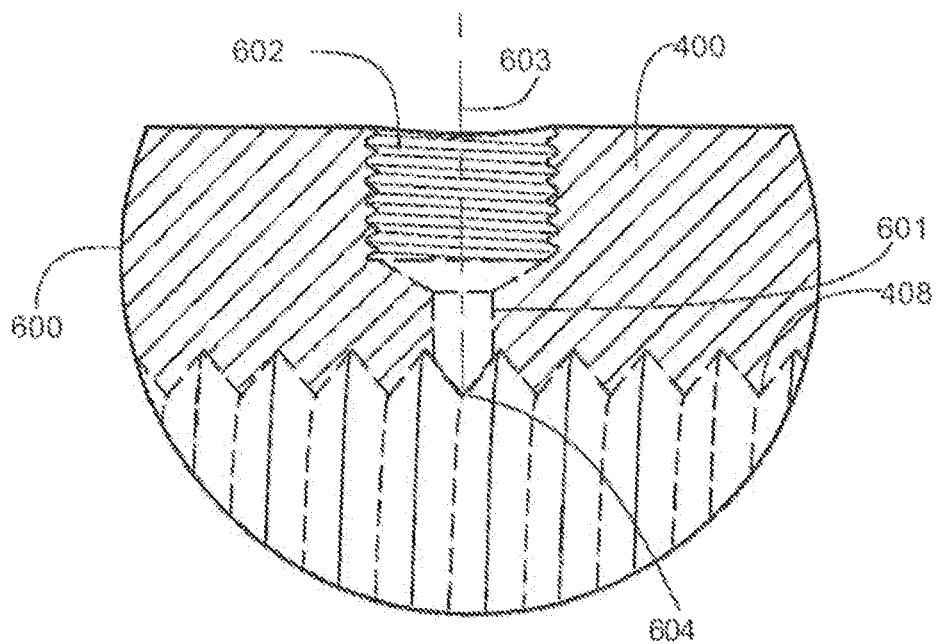
FIG. 7B is a close-up view of a section of FIG. 7A.

The inlet port may be incorporated in the outer perimeter surface and through to the inner surface of the sleeve. As shown in FIG. 7B, the sleeve is configured to incorporate a sleeve cylindrical helical thread 408 along the full length of the sleeve 400. Embodiments of a sleeve of the present invention may each incorporate a different number of rounds of the sleeve cylindrical helical thread wrapped around the circumference of the interior surface. At least a portion of the sleeve cylindrical helical thread will be configured to integrate with the channel carrier cylindrical helical thread to form a composite channel along at least a portion of the sleeve and channel carrier, as discussed herein.

An expanded view of segment 600 of FIG. 7A is shown in FIG. 7B. The inlet port 602 is positioned through the wall of sleeve 400. The inlet port may incorporate an extension end 601 facing the channel carrier. The extension end is configured to be aligned with a center line 603 of the inlet port. The extension end extends into a channel carrier groove 604 formed in the channel carrier between the walls of the channel carrier cylindrical helical thread. The diameter of inlet port extension is less than the width between the walls formed by the sleeve cylindrical helical thread that the inlet port extends through. In a preferred embodiment of the present invention, the channel carrier is positioned within the sleeve such that the center line 603 is positioned to be aligned with the center of the width of the channel carrier groove 604. Such positioning of the channel carrier is achieved by the configuration of the sleeve thread and the channel carrier grooves (formed between the walls of the channel carrier cylindrical helical thread), whereby the center position between the walls formed by the sleeve thread aligns with the center of the channel carrier groove when the channel carrier is fit within the sleeve, such that the portion of the channel carrier groove proximate to the inlet port is always aligned with the inlet port when the valve is operable.

The alignment of the inlet port extension end with the channel carrier groove provides a smooth transition passage for fluid flowing from the sleeve inlet port to the channel carrier groove. One or more rotations of the channel carrier within the sleeve will cause the inlet port to be positioned so as to align with a different portion of the channel carrier groove (such that the inlet port is aligned with a portion of the groove that is incorporated in a different composite channel round that the portion of the groove that the inlet port was aligned with prior to the rotation of the channel carrier). The same smooth transition passage for fluid will be maintained in each interaction of the inlet port with a groove of a channel carrier round.

In some embodiments of the present invention, the valve of the present invention may be incorporated with, or otherwise attached to, a robotic mechanism, for example, such as an actuator assembly. Such an embodiment that combines the valve of the present invention with other elements constitutes a valve assembly. In such an embodiment of the present invention, as shown in FIG. 8, the valve comprises a channel carrier 402 installed and fit within the sleeve 400. End caps 701A and 701B are attached to each end of the sleeve.

End cap 701A is configured to incorporate a stem packing 707. A stem 708 is connected on one end to the channel carrier, and the stem extends through the stem packing and end cap 701A to reach the channel carrier. The stem packing prevents fluid from exiting the valve housing by flowing along the stem. (The channel carrier and sleeve are positioned within the valve housing.) The stem 708 is connected on its other end to a gear and motor assembly, for example, such as the assembly 709 shown in FIG. 9. The assembly may incorporate an actuator. As shown in FIG. 8, the shaft may be connected to such an assembly by a coupler 700.

End cap 701A may further incorporate a pressure relief port 706 that is connected to the inlet port 602. The pressure relief port can also be referenced as the overflow port. An overflow port (pressure relief port) can be operable to allow for overflow of fluid from a fluid distribution system connected to the overflow port to flow from the fluid distribution system through the overflow port and thereby into the valve housing and possibly thereby into the valve and/or the composite channel of the valve. As the terms overflow port and pressure relief port are interchangeable herein, all functions of the pressure relief port described herein can be ascribed to an overflow port, including that fluid can flow from the valve and the housing, through the overflow port and into the inlet port, whereby it flows into the valve.

Figure 10:
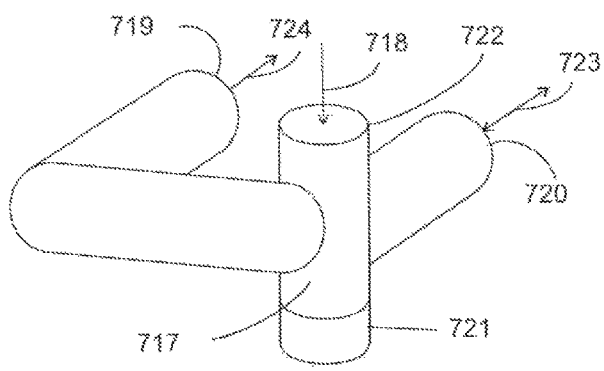
FIG. 10 is a perspective view of a fluid passageway connectable to the valve housing of an embodiment of the present invention.

In embodiments of the present invention, the connection between the pressure relief port and the inlet port may be by way of a port connector assembly, for example, such as a port connector assembly shown in FIG. 10. The pressure relief valve is operable to prevent a buildup of positive or negative pressure within the interior of the valve housing 705 wherein the sleeve and channel carrier are situated. The port connector assembly is operable to maintain the pressure at the pressure relief port and the inlet port as equal or virtually equal, or otherwise balanced. The operation of the pressure relief port minimizes the torque level required to rotate the channel carrier to thereby alter the position of the channel carrier in either direction. This pressure relief port may cause the present invention to be energy efficient.

As shown in FIG. 8, end cap 701B is configured to incorporate an output port 703 in the lower portion 702 of the valve. The output port incorporates a disc surface 704 operable to achieve flush mating between the closing disc surface 501 of the channel carrier and the outlet port. The closing disc surface and outlet port will only be in contact when the channel carrier is moved towards the output port to a sufficient extent that the closing disc surface touches the outlet port. In such a position the valve is closed to the flow of fluid, such that the fluid cannot exit the valve via the outlet port.

Figure 9:
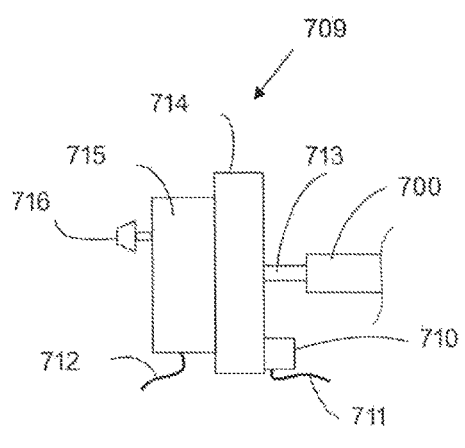
FIG. 9 is a perspective view of a motor assembly connected to the valve assembly shown in FIG. 8.

A periodic robotic manipulation of the valve of the present invention can be achieved through use of an assembly, for example, such as the assembly shown in FIG. 9. Such period robotic manipulation of the valve can be achieved for a brief period and can detect and clear a debris buildup within the sleeve cylindrical helical thread and channel cylindrical helical carrier thread. An occurrence of debris buildup may be sensed by logical deduction; as by sensing at stem position indicator whether an application of a robotic command to the valve that is intended to achieve an operation to change the active channel length instead results in a lack of a corresponding rotation.

Operation of the valve of the present invention may be achieved manually in embodiments of the present invention. Embodiments of the present invention that are operated manually may incorporate a coupler that is configured to accept and connect with the stem, and such stem may be incorporated in an assembly that is attached to the valve of the present invention, or the stem may be a standalone element or attached to a coupler. For example, the coupler may incorporate a socket with a square cross-section therein that is operable to accept a squared stem. While it is transmitting the torque required for rotation of the stem, the stem slides back and forth through the coupler socket length. As the stem is attached to the channel carrier, rotation of the stem generates rotation of the channel carrier within the sleeve.

For a non-manual operation of the valve of the present invention, the end of the coupler that is not attached to the stem may be secured to a drive shaft stem 713 that is connected to a gear assembly 714, as shown in FIG. 9. The gear assembly 714 interfaces between the multi-turn motor 715, the coupler 700 and the drive shaft stem position indicator 710. The drive shaft stem position indicator may be a sensor, and embodiments of the invention may incorporate other additional sensors operable to transmit information regarding the function of the valve to an operator.

The drive shaft stem position indicator is operable to generate a 1:1 electronic indication of both: the rotational position of the drive shaft 713 through the one or more turns ("n" turns where "n" represents the number of turns) of the stem 708; and the position of the channel carrier within the valve housing as such position is directly related to the number of turns that have been effected upon the channel carrier. This electronic indication may be transferred as information to an information device (e.g., a laptop, a computer, a hand held mobile device, or some other digital device that is either connected to the assembly via wired 711, 712 or wireless connection). The information device may be utilized by a user of the valve to receive the information transmitted thereto.

The stem position indicator 710 is further linked to the gear assembly 714. The gear assembly is in turn is linked to both the multi-turn motor 715 and the gear shaft stem 713.

In some embodiments of the present invention, the multi-turn motor 715 may be operated by an alternating current from an A/C voltage source applied in the form of a robotic floating point interface. The robotic floating point interface may provide three possible signals; a signal to rotate clockwise; a signal to rotate counter clockwise; no signal. The signal to rotate clockwise or the counter clockwise signal results in operation of the multi-turn motor, the gears of the gear assembly and the gear shaft stem, whereas no signal causes all of the multi-turn motor, the gears of the gear assembly and the gear shaft stem to remain stationary. The floating point interface provides the greatest rotary resolution for incremental changes in stem rotations, and as a result incremental changes in differential pressure loss in the valve.

In some embodiments of the present invention, an alternate analog signal interface to the floating point interface may be incorporated.

An optional manual, electric, position override 716 may be incorporated in the assembly and this override may be used during set-up of the valve, maintenance of the valve and emergency situations.

An example of a port connector assembly that may be utilized to connect the pressure relief port and the inlet port of the valve of the present invention is shown in FIG. 10. Composite channel inlet port 722 may be positioned to receive fluid flowing from a fluid distribution system. Fluid will flow from the fluid distribution system through into the port connector assembly 717 in the direction indicated by arrow 718. The composite channel outlet port 719 may be connected to the inlet port in the sleeve of the valve (such as inlet port 602 shown in FIG. 8) and fluid may flow from the composite channel outlet portion 719 and into the inlet port thereof in the direction indicated by arrow 724. When the channel carrier is stationary, fluid may thereby flow from the fluid distribution system through the port connector assembly and into the valve relief port. The port connector assembly is operable to facilitate an almost equal pressure at both the valve inlet port (such as inlet port 602 shown in FIG. 8), and at the pressure relief port (such as pressure relief port 706 shown in FIG. 8).

Fluid may flow into and out of inlet/outlet port 720 in the direction indicated by arrow 723. Fluid may flow from the pressure relief port and enter the inlet/outlet port 720 when the channel carrier is moved so as to be repositioned and is thus positioned in close proximity to valve inlet port (such as inlet port 602 shown in FIG. 8), thereby creating a slight positive pressure at the pressure relief port (such as pressure relief port 706 shown in FIG. 8) that is greater than the pressure at the valve inlet port. Fluid may exit the inlet/outlet port 720 and flow into the pressure relief port when the channel carrier is rotated, so as to be repositioned, to a position that is in close proximity to the valve outlet port (such as outlet port 703 shown in FIG. 8), thereby creating a slight positive pressure at valve inlet port (such as inlet port 602 shown in FIG. 8) that is greater than the pressure at the pressure relief port.

When fluid enters the composite channel inlet port 722 the momentum of the debris within such fluid continues in the direction indicated by arrow 718, and the debris thereby flows into the debris trap 721. Fluid devoid of debris will flow along a path that incorporates a bend, for example, such as a 90 degree or other degree of bend, such that the fluid continues to flow in composite channel 717 to either of outlet port 719 or the inlet/outlet port 720.

A port connector assembly incorporated in any embodiment of the present invention may be configured in various forms to accommodate the various physical mounting arrangements and fluid flow requirements of the valve of the present invention.

Figure 11:
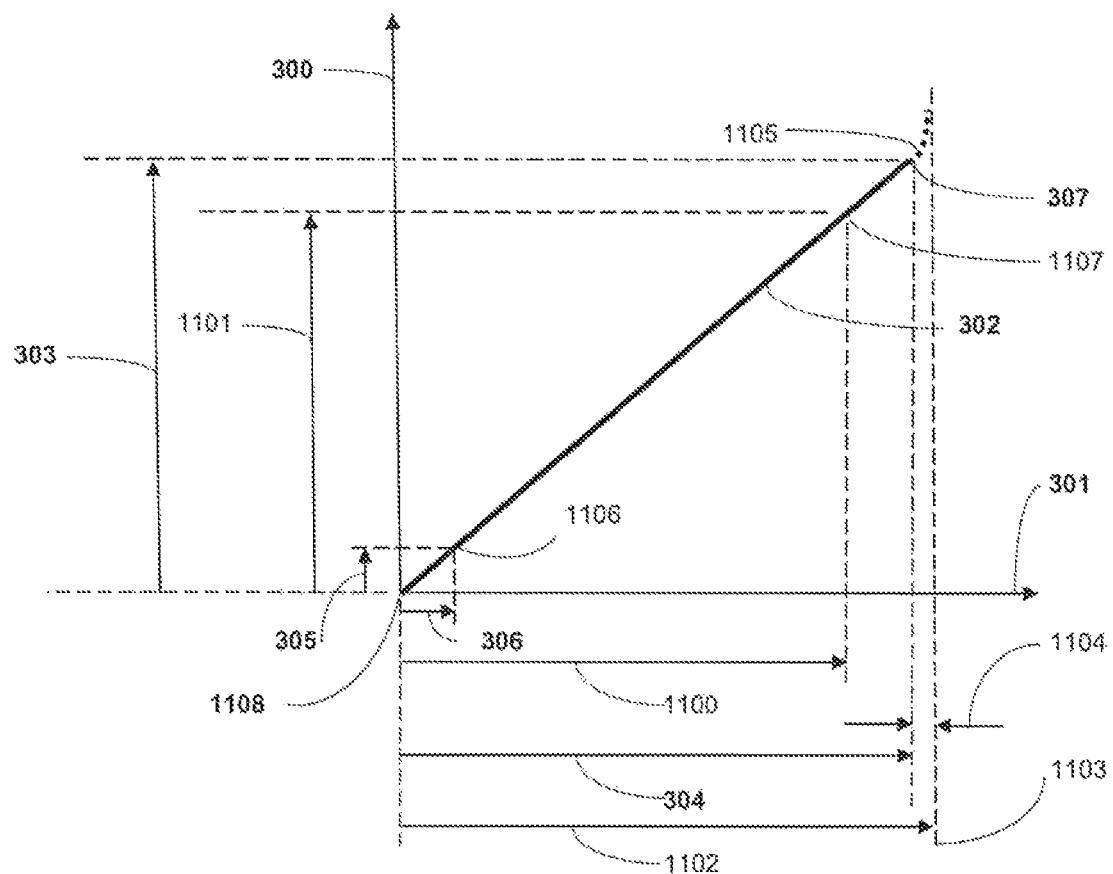
FIG. 11 is a graph showing the effect upon differential pressure loss created by the positioning of the channel carrier in various positions within the valve housing and thereby altering the length of the composite channel, as occurring within a valve of an embodiment of the present invention.

The graph of FIG. 11 shows the relationship of the differential pressure loss to alterations in active channel length. Pressure varies within the composite channel based upon the active channel length. Said graph incorporates a vertical axis representing differential pressure loss 300 and a horizontal axis representing active channel length 301.

The graph compares differential pressure loss produced by a fluid passing through the valve between the inlet port and outlet port at a specific flow rate, in embodiments of the present invention incorporating: (i) open valve differential pressure loss 305 and open active channel length 306 (being less than either (ii) and (iii)); (ii) greater differential pressure loss 303 and greater active channel length 304 (being greater than (i) and (ii)); (iii) lesser differential pressure loss 1101 and lesser active channel length 1100 (being greater than (i) and less than (ii)).

Reference 1103 indicates a closed valve position (being the position of the valve of the present invention wherein the channel carrier is moved towards the outlet port 703 and the closing surface 501 is in contact with the closing port surface 704). Reference 1102 represents the distance travelled by the channel carrier from the location indicated by reference 1108 (which represents the channel carrier in a position whereby it is fully withdrawn from the portion of the sleeve between the inlet port and the outlet port) and a closed valve position.

Active channel lengths as shown in the graph are the lengths of the composite channel section that is downstream of the inlet port 602 and that extend from the inlet port to the downstream end 502 of the channel carrier closest to the output port 703. The greater active channel length 304 depicts the whole of the full possible extent of the active channel length. Reference 1104 represents the additional length from the channel carrier that fluid must flow to arrive at the closing position of the valve indicated by reference 1103.

As the channel carrier travels through the distance indicated by reference 1104, simultaneously the last round of active channel length passes by the inlet port 602. When the closure surface 501 contacts the closing surface 704 at the output port 703 the last round of active channel length has completed its passage by the inlet port 602 thus closing the inlet port. For example, as there is no channel in the thread of the channel port between 503 and 500 of the channel carrier shown in FIG. 5, in such a position the inlet port is effectively closed to fluid flow. When the valve is closed both inlet port 602 and outlet port 703 are closed to fluid flow.

While the channel carrier is rotating toward the closed position, indicated as reference 1103 in FIG. 11, and active channel length is greater than the maximum active channel length 304, the specific flow of the fluid is forced through an increasingly smaller orifice toward the closed position and generates a consistently increasing pressure that is illustrated by locus 1105, until full closure occurs at both the inlet port 602 and outlet port 703.

The maximum length of the active channel length represented by active channel length shown as reference 304 may be lessened as the channel carrier moves away from the output port 703 and toward the input port 602. Such movement is achieved by rotation of the channel carrier, and such movement causes a reduction of the active channel length.

Withdrawal of the channel carrier from the closed position indicated as reference 1103, to a new position that is an active channel length as shown as reference 304, achieves both: (i) the maximum, 100%, active channel length; and (ii) the maximum differential pressure loss indicated at reference 307.

A further reduction of the active channel length to a lesser differential pressure loss 1101 and a lesser active channel length 1100, achieves the differential pressure loss indicated at reference 1107. At reference 1107 the differential pressure loss 1101 represents a possible application design pressure, for an embodiment of the invention to be incorporated in a particular fluid distribution system industrial use, which the fluid distribution system may be expected to apply to the valve of the present invention. This is due to the fact in accordance with application design specifications set by the fluid distribution system the differential pressure loss will typically be approximately 85% of the device maximum differential pressure loss, all at the specified application maximum flow.

With a further reduction of active channel length, open active channel length 306 may be reached whereas differential pressure loss is generated as is indicated as reference 1106. The differential pressure loss indicated at reference 1106 is lesser than the differential pressure loss indicated at reference 1107.

With a further reduction of active channel length to a zero length as indicated at reference 1108, the channel carrier is fully withdrawn such that the channel carrier is not positioned between the inlet port 602 and the outlet port 703. In this position the valve is fully open and fluid flows directly from the inlet port 602 through a section of the sleeve that is devoid of any channel carrier, to the outlet port 703 where it exits the valve. When the channel carrier is in such a position, concurrently the differential pressure loss is reduced to zero, and the active channel length is reduced to zero, as indicated by reference 1108. Thus, when active channel length is equal to zero, the differential pressure loss will also be equal to zero.

Normal operation in industrial uses of the valve of the present invention involves the channel carrier travelling along the complete spectrum of the range of possible active channel lengths that the channel carrier can achieve in the positions it can be positioned within the sleeve, as are indicated by reference 1102.

Whenever the channel carrier is withdrawn from the outlet port 703 the sleeve interior chamber 705 will be under a slight increase in pressure. This pressure differential is minimized by the external port connector assembly 717 that can be connected to the valve between the inlet port 602 and the relief port 706.

This relief connection substantially reduces the energy required of the actuator to quickly move the channel carrier 402 further away from the outlet port 703, thereby creating a more energy efficient device.

Whenever the channel carrier 402 is moved toward the outlet port 703 the sleeve chamber within the valve housing 705 will be under a slight decrease in pressure. This pressure differential is minimized by the port connector assembly 717 positioned between the inlet port 602 and the pressure relief port 706. This port connector assembly between the inlet port and the pressure relief port substantially reduces the energy required for the actuator incorporated in the assembly 709 to quickly move the channel carrier towards the outlet port 703. This functionality and configuration causes the valve of the present invention to be energy efficient.

The movement of the channel carrier towards the outlet portion of the valve creates a build-up of pressure within the valve. When the channel carrier is withdrawn, so as to be rotated such that it moves away from the valve outlet port, the pressure is reduced. The reduction in pressure is reflected in a variation of the differential pressure loss within the valve between the position of the channel carrier in proximity to the outlet port and positions of the channel carrier that are of lesser proximity to the outlet port.

By design, the present invention is operable at a differential pressure loss range between 0 and "y", where "y" represents the differential pressure loss corresponding to the flow of "x" gpm, when the active channel length is zero.

With the active channel length at 100% (being the maximum active channel length possible to exist based on the configuration of the channel carrier) and the fluid flow at flow "x" gpm, the total differential pressure loss between the inlet and outlet ports in the valve housing is equal to M*y.

In short, the present invention has a M*y:y amplification ratio. The factor M is constant for each embodiment of the present invention.

The present invention is operable for industrial uses (e.g., HVAC, machines, etc.) that have an application range, being a specific flow range that is between 0 to "x" gpm, and a differential pressure loss range of 0 to "M*y", where "y" corresponds to the flow "x".

Examples of possible positions of the channel carrier within the sleeve in embodiments of the present invention are shown in FIGS. 12A-12D.

In embodiments of the present invention the channel carrier may not be positioned between the inlet port 602 and the outlet port 703, such that fluid that enters the valve via the inlet port may not flow through any portion of the composite channel before reaching the outlet port. In other words, there may be no active channel length between the inlet port and the outlet port.

Figures 12A, 12B, 12C, 12D:
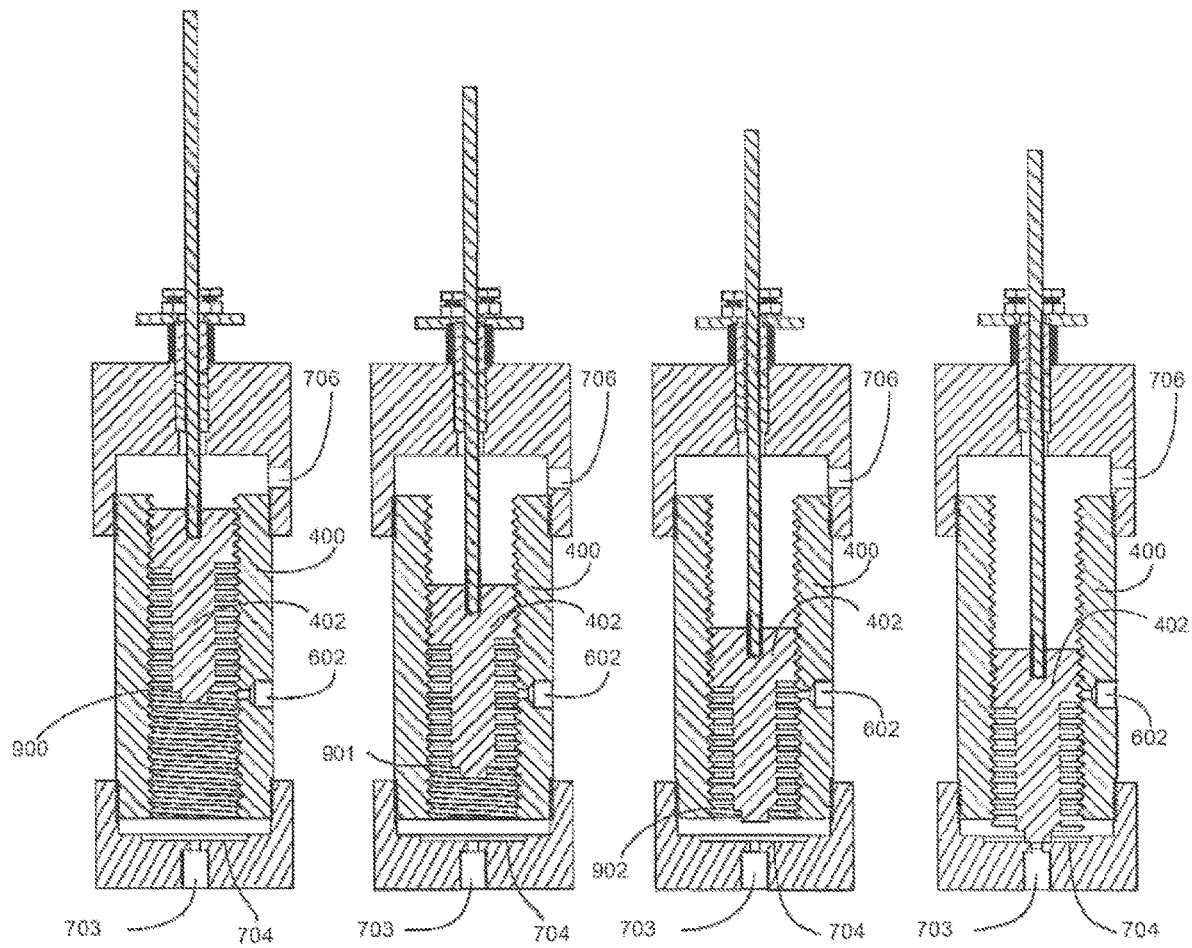
FIGS. 12A, 12B, 12C and 12D are cross-sectional views of the channel carrier in varying positions within the valve housing.

As shown in FIG. 12A, the valve may be in a fully open position when the channel carrier is positioned upstream from the inlet port of the sleeve. In this position fluid flowing into the inlet port 602 will not flow through any composite channel or any groove of the channel carrier (said groove being located between the walls formed by the cylindrical helical thread of the channel carrier) as the fluid flows downstream to the outlet port 703. The fluid will flow from the inlet port 602 through the sleeve interior and to the outlet port 703. The position of the closing surface 501 is at upstream position 900. This position corresponds to reference 1108 in the graph shown at FIG. 11, wherein the active channel length is zero, and the valve is fully open.

As shown in FIG. 12B, the valve may be in a closing position when the channel carrier is positioned such that a portion the channel carrier is downstream of the inlet port 602. In this position of the channel carrier, fluid flowing into the inlet port 602 will flow through the portion of the composite channel and the groove in the channel carrier (said groove being located between the walls formed by the cylindrical helical thread of the channel carrier) that is downstream of the inlet port as the fluid flows downstream toward the outlet port 703. The position of the closing surface 501 is at a downstream position 901. A closing position can be achieved at any of a range of closure percentages. For example, at one closing position the valve can correspond to reference 1100 in the graph shown in FIG. 11, wherein the valve is in an 85% closed position, and in such a position the active channel length is approximately 85% of the maximum active channel length possible to be achieved by the channel carrier within the sleeve for that embodiment of the present invention.

As shown in FIG. 12C, the valve may be in a near-closed position when the channel carrier is positioned such that a portion the channel carrier is downstream of the inlet port 602 and the closing surface 501 is in close proximity to the outlet port 703. In this position fluid flowing into the inlet port 602 will flow through the portion of the composite channel and the groove of the channel carrier (said groove being located between the walls formed by the cylindrical helical thread of the channel carrier) that is downstream of the inlet port as the fluid flows downstream towards the outlet port 703. The position of the closing surface 501 is at a downstream position 902. In a near-closed position the active channel length is 100% of the maximum active channel length possible to be achieved by the channel carrier within the sleeve for that embodiments of the present invention.

As shown in FIG. 12D, the valve may be in a fully closed position when the channel carrier is positioned such that a portion the channel carrier and the groove therein (said groove being located between the walls formed by the cylindrical helical thread of the channel carrier and being the groove in the channel carrier that is operable to form part of a composite channel when the channel carrier is fit within the sleeve), is downstream of the inlet port 602 and the closing surface 501 is in contact with the outlet port 703. In this position fluid flowing into the inlet port 602 will not flow through any portion of any channel of the channel carrier that is downstream of the inlet port. The position of the closing surface 501 is in contact with the closure surface 704. In a fully closed position the active channel length is 100% of the maximum active channel length possible for that embodiment of the present invention, and the closing surface 501 is in full contact with the closure surface 704 at the outlet port 703. In this position the valve is fully closed to fluid flow.

Figure 13:
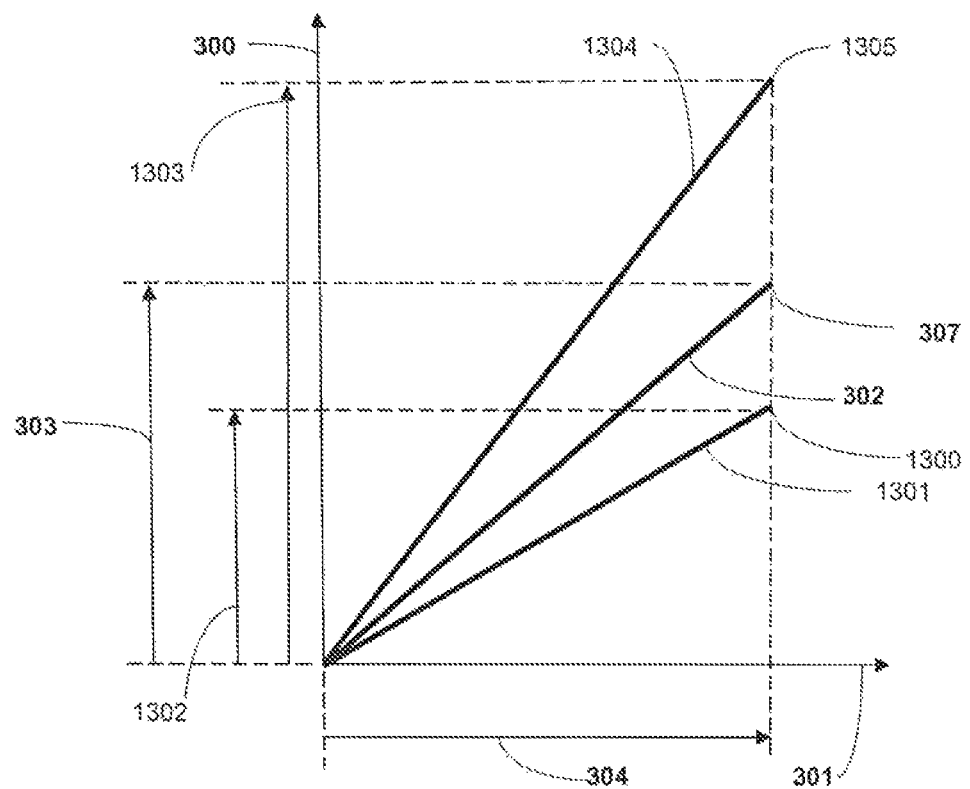
FIG. 13 is a graph showing the effect upon differential pressure loss created by various different flow rates of fluid through the valve housing and composite channel, as occurring within a valve of an embodiment of the present invention.

The graph of FIG. 13 shows differential pressure loss as a function of active channel length based on a comparison of different flow levels. The contents of the graph reflect that increased fluid flow volume will cause increased pressure within the active channel length, and that decreased fluid flow volume will cause decreased pressure within the active channel length. The vertical axis 300 indicates differential pressure loss, and the horizontal axis 301 indicates active channel length. The value of K is a function of all of the following: composite channel geometry; the material that the channel carrier and sleeve are formed of; and fluid flow. With all the same components of K, but with a change of the fluid flow component, the value of K changes. All of the loci shown in the graph of FIG. 13 reflect a valve that incorporates active channel length 304 that is the maximum (100%) active channel length possible in a channel carrier of an embodiment of the present invention. The flow is altered for each of the examples depicted in the graph, which results in alterations in differential pressure loss.

As shown in FIG. 13, at the base value of K and the base fluid flow of "f", the max differential pressure loss value is shown on locus 302 at reference 307. This result is relational to the differential pressure loss shown as reference 303.

With an increase in the fluid flow above the base flow of "f", the gain K is at a higher value as shown upon locus 1304 that represents the transfer function of the valve. The differential pressure loss value also increases to that shown upon locus 1304 at reference 1305. This result is relational to differential pressure loss shown as reference 1303.

With a decrease in the fluid flow below the base flow of "f", the gain K is at a lower value as shown upon locus 1301 that represents the transfer function of the valve. The maximum differential pressure loss value is also decreased to that shown upon locus 1301 at reference 1300. This result is relational to the differential pressure loss shown as reference 1302.

Figure 14:
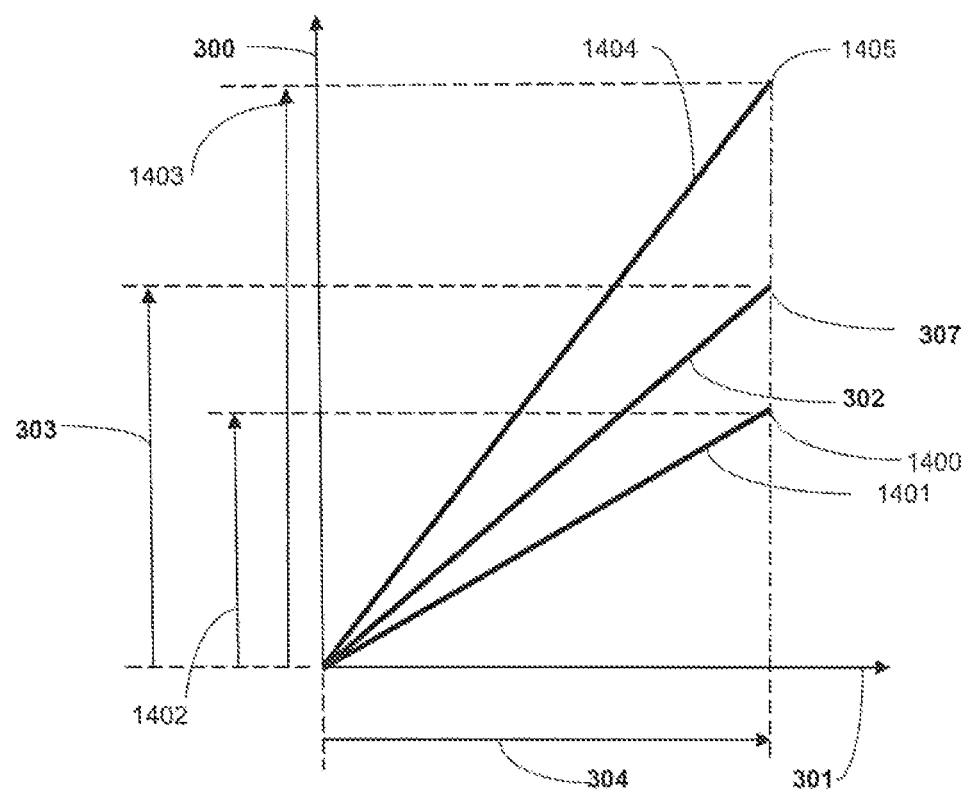
FIG. 14 is a graph showing the effect upon differential pressure loss created by various different cross-sections configurations of the valve housing and composite channel, as occurring within valves of embodiments of the present invention.

The graph of FIG. 14 shows differential pressure loss as a function of active channel length and provides a comparison thereof to the base value shown as locus 302 in FIG. 13. The differential pressure loss may be varied by altered configurations of the cross-section of the composite channel. The vertical axis 300 indicates differential pressure loss, and the horizontal axis 301 indicates active channel length. The value of K is a function of a variety of factors, as discussed herein, including the cross-section of the composite channel. A change of the composite channel cross-section component of K, while all of the other components of K remain constant, can cause the value of K to change. All of the loci shown in the graph of FIG. 14 are for a valve that incorporates a base fluid flow of "f", and an active channel length 304 that is the maximum (100%) possible active channel length. The composite channel cross-section is altered for each of the examples depicted in the graph, which results in alterations in differential pressure loss.

Examples of changes in the composite channel cross-section are show in FIGS. 4A, 4B and 4C, that show that the geometry of the cylindrical helical threads and grooves (said grooves being formed between the walls of the cylindrical helical thread) in the inner surface of the sleeve and the outer surface of the channel carrier can vary the cross-section of the composite channel, formed when the channel carrier is within the sleeve. The channel carrier portion of the composite channel 405 shown in FIG. 4A is larger in the configuration of the cylindrical helical threads and grooves of each of the channel carrier and the sleeve, than the sleeve portion of the composite channel 413 shown in FIG. 4B or the channel carrier portion of the composite channel 420 shown in FIG. 4C.

Thus, the cross-section of the composite channel shown in FIG. 4A is larger than either of the cross-section of the composite channel shown in FIGS. 4B and 4C. The larger the composite channel cross-section the more fluid (larger volume) that can flow through the composite channel simultaneously, and the lower the pressure and gain within the composite channel. As the composite channel cross-section decreases (due to composite channel geometries) an increase in pressure and gain in the fluid flowing therein is generated.

A decrease in the composite channel cross-section, to below a base composite channel cross-section, causes the value of K to increase to that indicated as reference 1405 as shown on locus 1404. This is relational to differential pressure loss indicated as reference 1403. Thus, a decrease in composite channel cross-section causes the gain K to change to a higher value, and locus 1404 represents the transfer function of the valve.

An increase in composite channel cross-section to above a base composite channel cross-section, causes the value of K to decrease to that indicated as reference 1400 as shown on locus 1401. This is relational to differential pressure loss indicated as reference 1402. Thus, an increase in composite channel cross-section causes the gain K to change to a lower value, and locus 1401 represents the transfer function of the valve.

Figure 15:
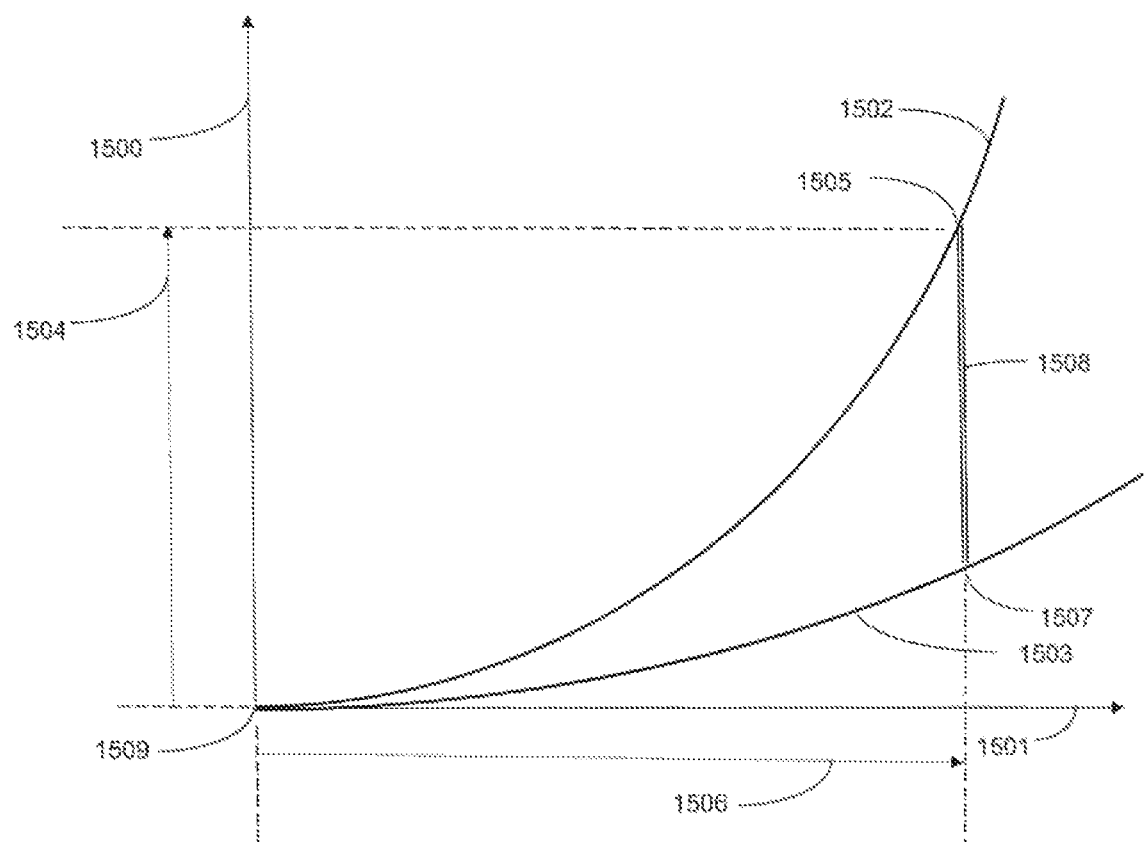
FIG. 15 is a graph showing the effect upon differential pressure loss created by alterations in the area within the composite channel cross-section, as within valves of embodiments of the present invention.

The graph of FIG. 15 shows active channel length as relational to differential pressure loss and fluid flow. The active channel length can affect the linearity of differential pressure loss. The vertical axis 1500 indicates differential pressure loss, and the horizontal axis 1501 indicates fluid flow, that is application design flow (being the flow that a valve of an embodiment of the present invention was designed to achieve in a particular industrial use (e.g., in HVAC, a machine, etc.)). Reference 1509 indicates a point at which the differential pressure loss and flow are both at zero.

Locus 1503 indicates differential pressure loss values associated with miscellaneous fixed restrictions to flow that are inherent in the cylindrical helical channel valve assembly of the present invention, at various flow values ranging from 0% (at reference 1509) to 100% of the application design flow as indicated at reference 1506. Locus 1503 represents differential pressure loss values at various flow levels below the application design flow indicated at reference 1506, occurring when the valve is fully open and active channel length is zero.

Locus 1502 indicates differential pressure loss values with miscellaneous fixed restrictions to fluid flow that are inherent in the cylindrical helical composite channel valve assembly of the present invention, as well as the differential pressure loss associated with the active channel lengths between zero (fully open valve) and the maximum possible active channel length (near closed valve) (as indicated by range 1504), at various flow values ranging from zero (as indicated at reference 1509) to an application design flow indicated at reference 1506, whereby the valve is almost closed and the active channel length is at its maximum (100%).

Range 1508 represents the range of differential pressure loss associated with the active channel length range of values from zero (as indicated by reference 1507) to maximum (100%) active channel length (as indicated at reference 1505), at application design flow value 100% (as indicated by reference 1506).

The graph depicts the linear relationship between the vertically linear variation of differential pressure loss, and flow. In accordance with the linear relationship between differential pressure loss and active channel length, as is shown in FIG. 3, it is also true that range 1508 represents that active channel length occurring between values of 0% (as indicated by reference 1507) and 100% (as indicated by reference 1505), varies linearly with valve differential pressure loss. Thus, range 1508 represents a linear relationship to differential pressure loss, as well as a linear representation of the active channel length.

Figure 16:
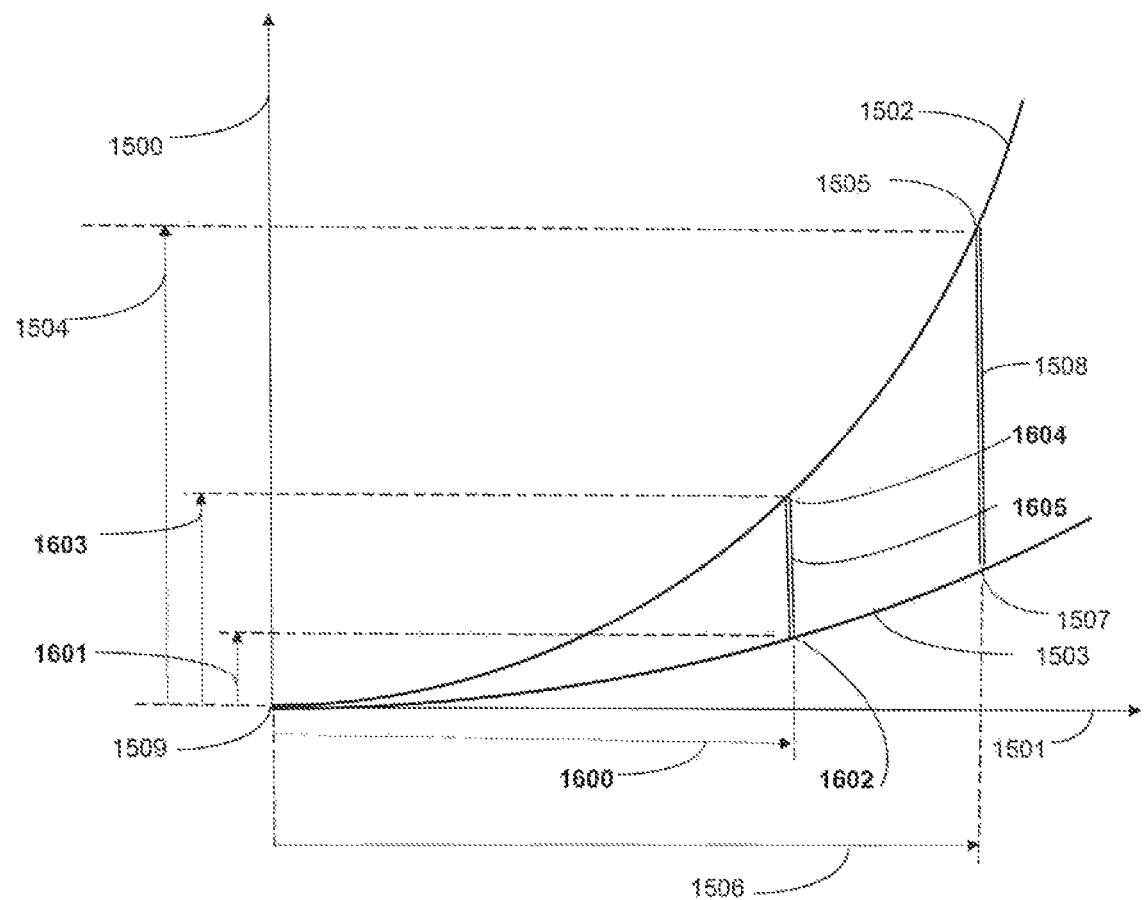
FIG. 16 is a graph showing the effect upon differential pressure loss created by alterations in differential pressure and flow of fluid, as occurring within a valve of an embodiment of the present invention.

The graph of FIG. 16 shows gain K as relational to differential pressure loss and fluid flow. This graph indicates a relationship between fluid flow and gain, such that decreased flow will create an equal decrease in gain (K). The vertical axis 1500 indicates differential pressure loss, and the horizontal axis 1501 indicates flow, that is application design flow (being the flow that a valve embodiment was designed to achieve in a particular industrial use (e.g., in HVAC, a machine, etc.)). Reference 1509 indicates a point at which the differential pressure loss and fluid flow are both at zero.

FIG. 16 shows the same content as is indicated in FIG. 15 as the base for the purpose of generating a comparison. FIG. 16 shows contrasting data added to such base content. When application design flow value is approximately 70% as indicated at reference 1600, range 1605 represents the range of differential pressure loss associated with the active channel length range of values from: 0% as indicated at reference 1602 (at which value the valve is nearly fully closed) when the differential pressure loss is as indicated by reference 1601; to 100% as indicated at reference 1604 (at which value the valve is fully open as indicated by range 1504), when the differential pressure loss is as indicated at reference 1603. Thus, locus 1603 indicates 100% of differential pressure loss for a valve embodiment of the present invention configured for a particular application design flow value as indicated by reference 1600, and range 1601 indicates 100% of differential pressure loss for a valve embodiment of the present invention configured for a different particular application design flow value.

Range 1508 and locus 1605 both represent the same active channel length, namely 100%.

Range 1605 represents the range of differential pressure loss associated with the active channel length range of values from zero (as indicated by reference 1602) to maximum (100%) active channel length (as indicated at reference 1604), at application design flow value 100% (as indicated by reference 1600).

Range 1605 indicates a linear relationship between the vertically linear variation of differential pressure loss, and active channel length. Thus, range 1605 also represents the range of active channel length occurring between values of 0% (as indicated by reference 1602) and 100% (as indicated by reference 1604).

As shown by range 1508, a larger range of differential pressure loss values occur at a greater application design flow value (as indicated by reference 1506). As shown by range 1605, a smaller range of differential pressure loss values occur at a lesser application design flow value (as indicated by reference 1600). Based on this relationship:

differential pressure loss=$K$*active channel length

Thus, the gain (K) is greater at application design flow value 100% (as indicated by reference 1506) than at application design flow value 70% (as indicated by reference 1600). As is shown in FIG. 13, it is also evident in FIG. 16 that the value of gain (K) increases with increased flow. This is beneficial to the present invention in that this aspect of the present invention causes the differential pressure loss within a valve of the present invention to be linearly manipulated through changes in active channel length. Such manipulation can be achieved with ease compared to the effort required to achieve the same manipulation in prior art valves. The effect of the present invention is that it can be implemented in systems, such as fluid distribution systems, machines, HVAC and other systems, to regulate differential pressure loss and maintain the pressure therein as balanced.

It will be appreciated by those skilled in the art that other variations of the embodiments described herein may also be practiced without departing from the scope of the invention. Other modifications are therefore possible.

I claim:

1. A differential pressure loss valve comprising:
 a. a sleeve incorporating a cylindrical hollow section having a first continuous cylindrical helical thread formed in said cylindrical hollow section;
 b. a channel carrier incorporating a second continuous cylindrical helical thread formed in its entire outer wall and said channel carrier being configured to fit within the cylindrical hollow section of the sleeve such that at least a portion of the first continuous cylindrical helical thread of the sleeve overlaps with at least in part or whole of the second continuous cylindrical helical thread of the channel carrier, wherein:
 the second continuous cylindrical helical thread of the outer wall of the channel carrier, when being positioned within the sleeve, forms a first space between the second continuous cylindrical helical thread of a portion of the channel carrier and the first continuous cylindrical helical thread of the sleeve facing the portion of the channel carrier positioned within the sleeve that forms a composite channel, said composite channel having a constant cross-section;
 c. a housing configured such that the sleeve and the channel carrier are within the housing, wherein the housing comprises a first end cap configured to attach to an upper portion of the sleeve and a second end cap configured to attach to a lower portion of the sleeve;
 d. an inlet port configured to receive fluid into the housing; and
 e. an outlet port configured to allow fluid having entered the housing via the inlet port to exit the housing after flowing through the portion of the sleeve positioned downstream from the inlet port;
 f. a pressure relief port configured to allow an overflow of the fluid to flow into the inlet port,
 wherein the pressure relief port is incorporated in the first end cap of the housing, the outlet port is incorporated in the second end cap of the housing, and the inlet port is incorporated in the sleeve between the pressure relief port and the outlet port, and
 wherein fluid flows through the valve housing and a differential pressure loss of the valve is controllable by positioning the channel carrier within the sleeve.

2. The differential pressure loss valve of claim 1, wherein the channel carrier Is moveable to varying positions within the sleeve.

3. The differential pressure loss valve of claim 2, wherein the channel carrier is moved within the sleeve between positions that achieve a fully opened valve and a fully closed valve.

4. The differential pressure loss valve of claim 1, wherein the composite channel is operable for fluid to flow therein, and said portion of the composite channel that is downstream of the inlet port wherein fluid flows being an active channel length.

5. The differential pressure loss valve of claim 4, wherein the fluid flowing through the inlet port flows through one or more of the following within the valve before reaching the outlet port:
 a. the active channel length;
 b. a second space between the inlet port and the active channel length;
 c. a third space between the active channel length and the outlet port; and
 d. a fourth space between the inlet port and the outlet port wherein there is no active channel length positioned.

6. The differential pressure loss valve of claim 1, wherein the composite channel is configured at a constant cross-section throughout and the composite channel is formed of one or more rounds of helical grooves formed between thread walls of inner surface of the sleeve and outer surface of the outer wall of the channel carrier, each round and all rounds having a constant diameter, the fluid flow within said composite channel thereby achieving a consistent incremental differential pressure loss.

7. The differential pressure loss valve of claim 1, wherein the valve is configured for use in a range of flow and differential pressure loss applications as relate to various industrial uses.

8. The differential pressure loss valve of claim 1, wherein the valve is connected to an assembly.

9. The differential pressure loss valve of claim 8, wherein the assembly is operable to move the channel carrier to various positions within the sleeve by any of the following: manual operation; or robotic operation.

10. The differential pressure loss valve of claim 1, wherein the channel carrier is movable within the sleeve by rotation of the channel carrier and the overlap of the first continuous cylindrical helical thread of the sleeve and the second continuous cylindrical helical thread of the channel carrier causes and maintains alignment between the sleeve and the channel carrier therein.

11. The differential pressure loss valve of claim 1, wherein there is no seal formed between the second continuous cylindrical helical thread of the channel carrier and the first continuous cylindrical helical thread of the sleeve, and gaps exist in the composite channel between the overlap of the second continuous cylindrical helical thread of the channel carrier and the first continuous cylindrical helical thread of the sleeve.

12. The differential pressure loss valve of claim 11, wherein fluid may flow between the gaps, and such fluid is operable to lubricate the second continuous cylindrical helical thread of the channel carrier and the first continuous cylindrical helical thread of the sleeve to assist in the ease of movement of the channel carrier within the sleeve.

13. The differential pressure loss valve of claim 1, wherein the valve is configured to achieve constant gain and to function to achieve linearity.

14. The differential pressure loss valve of claim 1, wherein the cross-section of the composite channel is one of the following:
   a. a greater portion of the composite channel is formed between walls formed by the first continuous cylindrical helical thread of the sleeve;
   b. a greater portion of the composite channel is formed between walls formed by the second continuous cylindrical helical thread of the channel carrier; and
   c. the composite channel is formed within equal portions between the walls formed by the first continuous cylindrical helical thread of the sleeve and the walls formed by the second continuous cylindrical helical thread of the channel carrier.

15. The differential pressure loss valve of claim 1, wherein a composite channel section is positioned to connect the inlet port and the pressure relief port in the housing, whereby fluid can flow from the pressure relief port to the inlet port, and fluid can flow into the pressure relief port, and a pressure at the pressure relief port and a pressure at the inlet port are substantially equal.

16. The differential pressure loss valve of claim 15, wherein the composite channel section incorporates a debris trap operable to capture debris in the fluid and to prevent such debris from flowing to the inlet port.

17. A linear differential pressure loss valve comprising:
   a. a sleeve configured to incorporate a cylindrical hollow section therein having a first continuous cylindrical helical thread formed therein;
   b. a channel carrier incorporating a second continuous cylindrical helical thread formed in its entire outer wall and said channel carrier being configured to fit within the cylindrical hollow section of the sleeve such that at least a portion of the first continuous cylindrical helical thread of the sleeve overlaps with at least in part or whole of the second continuous cylindrical helical thread of the channel carrier, wherein:
   the second continuous cylindrical helical thread of the outer wall of the channel carrier, when being positioned within the sleeve, forms a space between the second continuous cylindrical helical thread of a portion of the channel carrier and the first continuous cylindrical helical thread of the sleeve facing the portion of the channel carrier positioned within the sleeve that forms a composite channel;
   c. a housing configured to fit the sleeve and channel carrier within the housing, wherein the housing comprises a first end cap configured to attach to an upper portion of the sleeve and a second end cap configured to attach to a lower portion of the sleeve;
   d. an inlet port positioned in connection with the cylindrical hollow section of the sleeve and configured to receive fluid into the housing, such fluid thereby flowing through the sleeve; and
   e. an outlet port configured to allow fluid having entered the housing via the inlet port to exit the housing;
   f. a pressure relief port configured to allow an overflow of the fluid to flow into the inlet port,
   wherein the pressure relief port is incorporated in the first end cap of the housing, the outlet port is incorporated in the second end cap of the housing, and the inlet port is incorporated in the sleeve between the pressure relief port an the outlet port, and
   wherein constant gain is achieved by a positioning of the channel carrier within the sleeve in accordance with the linear relationship between pressure loss and length of the composite channel.

18. The linear differential pressure loss valve of claim 17, wherein the valve is operable to produce a variable differential pressure loss that is linearly proportional to a portion of the composite channel that is positioned downstream of the inlet port, being the active channel length.

19. The linear differential pressure loss valve of claim 17, wherein differential pressure loss is linearly proportional to the active channel length such that gain is a function of one or more of the following:
   a. all material that the linear differential pressure loss valve is formed of;
   b. composite channel cross-sectional geometry (orifice) and dimension;
   c. maximum design flow that is specific to an industrial use the linear differential pressure loss valve is configured to be utilized with;
   d. diameter of the channels between walls formed by each of the second continuous cylindrical helical thread of the channel carrier and the first continuous cylindrical helical thread of the sleeve; and
   e. characteristics of the fluid that flows through the linear differential pressure loss valve.

* * * * *